United States Patent
Kawasaki et al.

(10) Patent No.: US 10,631,336 B2
(45) Date of Patent: Apr. 21, 2020

(54) WIRELESS COMMUNICATION TERMINAL, WIRELESS COMMUNICATION METHOD, AND RECORDING MEDIUM

(71) Applicant: OLYMPUS CORPORATION, Hachioji-shi, Tokyo (JP)

(72) Inventors: Shinya Kawasaki, Tokyo (JP); Yasuhiro Hasegawa, Hanno (JP); Kiyoshi Toyoda, Tokyo (JP)

(73) Assignee: OLYMPUS COPRORATION, Tokyo (JP)

( * ) Notice: Subject to any disclaimer, the term of this patent is extended or adjusted under 35 U.S.C. 154(b) by 7 days.

(21) Appl. No.: 16/174,943

(22) Filed: Oct. 30, 2018

(65) Prior Publication Data
US 2019/0069275 A1 Feb. 28, 2019

Related U.S. Application Data

(63) Continuation of application No. PCT/JP2017/018994, filed on May 22, 2017.

(30) Foreign Application Priority Data

May 24, 2016 (WO) .................. PCT/JP2016/065274

(51) Int. Cl.
*H04W 74/08* (2009.01)
*H04W 84/12* (2009.01)
(Continued)

(52) U.S. Cl.
CPC ....... *H04W 74/0808* (2013.01); *H04W 16/14* (2013.01); *H04W 72/02* (2013.01);
(Continued)

(58) Field of Classification Search
None
See application file for complete search history.

(56) References Cited

U.S. PATENT DOCUMENTS

2003/0125067 A1 7/2003 Takeda et al.
2007/0242650 A1 10/2007 Fujiwara
(Continued)

FOREIGN PATENT DOCUMENTS

JP 2003-258719 A 9/2003
JP 2006-25388 A 1/2006
(Continued)

OTHER PUBLICATIONS

Notice of Allowance dated Mar. 21, 2019, issued in U.S. Appl. No. 16/190,476 (16 pages).
(Continued)

*Primary Examiner* — Brian S Roberts
(74) *Attorney, Agent, or Firm* — Westerman, Hattori, Daniels & Adrian, LLP

(57) ABSTRACT

A controller of a wireless communication terminal wirelessly receives second communication channel information from a second wireless communication terminal using a communicator. The controller wirelessly transmits first communication channel information and the second communication channel information to a third wireless communication terminal using the communicator. The controller wirelessly receives third communication channel information from the third wireless communication terminal using the communicator. The controller wirelessly transmits the first communication channel information and the third communication channel information to the second wireless communication terminal using the communicator.

9 Claims, 22 Drawing Sheets

(51) Int. Cl.
*H04W 84/18* (2009.01)
*H04W 72/04* (2009.01)
*H04W 72/02* (2009.01)
*H04W 72/08* (2009.01)
*H04W 16/14* (2009.01)
*H04W 74/00* (2009.01)

(52) U.S. Cl.
CPC ......... *H04W 72/04* (2013.01); *H04W 72/082* (2013.01); *H04W 74/002* (2013.01); *H04W 84/12* (2013.01); *H04W 84/18* (2013.01)

(56) References Cited

U.S. PATENT DOCUMENTS

| | | | |
|---|---|---|---|
| 2009/0122775 A1 | 5/2009 | Haartsen | |
| 2009/0279463 A1 | 11/2009 | Kuliner et al. | |
| 2013/0176897 A1* | 7/2013 | Wang | H04W 12/06 370/254 |
| 2013/0294436 A1* | 11/2013 | Kim | H04W 16/14 370/338 |
| 2014/0287790 A1 | 9/2014 | Ichikawa et al. | |
| 2014/0313966 A1* | 10/2014 | Shukla | H04W 48/10 370/312 |
| 2016/0014780 A1 | 1/2016 | Horisaki et al. | |
| 2016/0127996 A1* | 5/2016 | Patil | H04W 48/16 370/311 |
| 2016/0323925 A1* | 11/2016 | Alanen | H04W 8/005 |
| 2018/0027420 A1 | 1/2018 | Takahashi et al. | |

FOREIGN PATENT DOCUMENTS

| | | |
|---|---|---|
| JP | 4311262 B2 | 8/2009 |
| JP | 2009-206999 A | 9/2009 |
| JP | 2011-15048 A | 1/2011 |
| JP | 1886814 B2 | 2/2012 |
| JP | 5210404 B2 | 6/2013 |
| JP | 2015-95838 A | 5/2015 |
| WO | 2015/034934 A2 | 3/2015 |

OTHER PUBLICATIONS

International Search Report dated Jun. 13, 2017, issued in application No. PCT/JP2017/018994, w/English translation (2 pages).
International Search Report dated Jun. 13, 2017, issued in application No. PCT/JP2017/018993, w/English translation (2 pages).
International Search Report dated Jun. 28, 2016, issued in application No. PCT/JP2016/065274, w/English translation (2 pages).

* cited by examiner

FIG. 3

| ITEM | RANGE | CONTENT |
|---|---|---|
| OWN TERMINAL MAC ADDRESS | 00:00:00:00:00:00~ FF:FF:FF:FF:FF:FF | MAC ADDRESS |
| SYNCHRONIZATION GROUP | 00:00:00:00:00:00~ FF:FF:FF:FF:FF:FF | GROUP NAME OF SYNCHRONIZED TERMINAL |
| SYNCHRONIZATION TIME INFORMATION | 0x0~0xFFFFFFFF | STARTING TIME POINT OF NEXT PAF COMMUNICATION |
| GLOBAL SEQUENCE NUMBER | 0x0~0xFFFF | TIME INFORMATION FOR INFORMATION REMOVAL |
| CONNECTION DESTINATION INFORMATION | 1/0 | PRESENCE INFORMATION OF CONNECTION DESTINATION |
| MAIN CHANNEL | 36ch~128ch | COMMUNICATION CHANNEL FOR MAIN COMMUNICATION |
| PAF CHANNEL | 36ch~128ch | COMMUNICATION CHANNEL FOR PAF COMMUNICATION |
| LATEST PER | 0~100 | ERROR RATE INFORMATION |
| HOP1 INFORMATION | 0~32 | NUMBER OF OTHER TERMINALS DETECTED BY OWN TERMINAL |
| SYNCHRONIZATION SWITCHING REQUEST | 1/0 | TERMINAL HAVING RECEIVED "1" EXECUTES SYNCHRONIZATION PROCESS |
| RESERVED AREA | | |

300 brackets the above rows.

SHARED INFORMATION

| ITEM | RANGE | CONTENT |
|---|---|---|
| OTHER TERMINAL MAC ADDRESS | 00:00:00:00:00:00~ FF:FF:FF:FF:FF:FF | MAC ADDRESS |
| CONNECTION DESTINATION INFORMATION | 1/0 | PRESENCE INFORMATION OF CONNECTION DESTINATION |
| MAIN CHANNEL | 36ch~128ch | COMMUNICATION CHANNEL FOR MAIN COMMUNICATION |
| PAF CHANNEL | 36ch~128ch | COMMUNICATION CHANNEL FOR PAF COMMUNICATION |
| RESERVED AREA | | |
| ⋮ | ⋮ | ⋮ |

301 brackets the shared information rows.

FIG. 15

| SYNCHRONIZATION INFORMATION OF TERMINAL 1 | | SYNCHRONIZATION INFORMATION OF TERMINAL 2 | | SYNCHRONIZATION INFORMATION OF TERMINAL 3 | | SYNCHRONIZATION INFORMATION OF TERMINAL 4 | |
|---|---|---|---|---|---|---|---|
| SYNCHRONIZATION G | TERMINAL 4 | SYNCHRONIZATION G | TERMINAL 4 | SYNCHRONIZATION G | TERMINAL 4 | SYNCHRONIZATION G | TERMINAL 4 |
| SeqNo | 8 | SeqNo | 8 | SeqNo | 8 | SeqNo | 8 |

FIG. 17

| SYNCHRONIZATION INFORMATION OF TERMINAL 1 | | SYNCHRONIZATION INFORMATION OF TERMINAL 2 | | SYNCHRONIZATION INFORMATION OF TERMINAL 3 | | SYNCHRONIZATION INFORMATION OF TERMINAL 4 | |
|---|---|---|---|---|---|---|---|
| SYNCHRONIZATION G | TERMINAL 4 | SYNCHRONIZATION G | TERMINAL 4 | SYNCHRONIZATION G | TERMINAL 4 | SYNCHRONIZATION G | TERMINAL 3 |
| SeqNo | 8 | SeqNo | 8 | SeqNo | 8 | SeqNo | 8 |
| TERMINAL 2 | | TERMINAL 1 | | TERMINAL 2 | | TERMINAL 3 | |
| SeqNo | 8 | SeqNo | 8 | SeqNo | 8 | SeqNo | 8 |
| | | TERMINAL 3 | | TERMINAL 4 | | | |
| | | SeqNo | 8 | SeqNo | 8 | | |

WIRELESS COMMUNICATION TERMINAL, WIRELESS COMMUNICATION METHOD, AND RECORDING MEDIUM

The present application is a continuation application based on International Patent Application No. PCT/JP 2016/065274, filed on May 24, 2016, and International Patent Application No. PCT/JP2017/018994, filed on May 22, 2017, the contents of which are incorporated herein by reference.

BACKGROUND OF THE INVENTION

Field of the Invention

The present invention relates to a wireless communication terminal, a wireless communication method, and a recording medium.

Description of Related Art

An image transmission system to which a wireless LAN defined by IEEE 802.11 is applied has been realized. Moreover, in recent years, since wireless channels have become congested as the number of wireless communication terminals has increased, it is desirable to effectively use wireless channels and realize an optimal arrangement of wireless channels.

A conventional technique for using a plurality of communication channels simultaneously during wireless communication is disclosed in Japanese Patent Publication No. 4311262. In this conventional technique, each communication station manages time information on a transmission time point and a reception time point of a beacon signal and communication channel information on communication channels used. Each communication station switches a communication channel used by the communication station on the basis of the time information and the communication channel information. The communication channel information on the communication channel used by each communication station is included in a beacon signal.

SUMMARY OF THE INVENTION

According to a first aspect of the present invention, a wireless communication terminal includes a communicator, a storage medium, and a controller. The wireless communication terminal belongs to a first wireless LAN (local area network). A first communication channel is used when communication is performed in the first wireless LAN. A second communication channel is used when communication is performed in a second wireless LAN different from the first wireless LAN. A third communication channel is used when communication is performed in a third wireless LAN different from the first wireless LAN and different from the second wireless LAN. A fourth communication channel is used when communication is performed between the first wireless LAN, the second wireless LAN, and the third wireless LAN. The storage medium stores first communication channel information indicating the first communication channel. The controller wirelessly receives second communication channel information from a second wireless communication terminal through the fourth communication channel using the communicator. The second communication channel information indicates the second communication channel. The second wireless communication terminal belongs to the second wireless LAN. The storage medium stores the received second communication channel information. The controller wirelessly transmits the first communication channel information stored in the storage medium and the received second communication channel information to a third wireless communication terminal through the fourth communication channel using the communicator. The third wireless communication terminal belongs to the third wireless LAN. The controller wirelessly receives third communication channel information from the third wireless communication terminal through the fourth communication channel using the communicator. The third communication channel information indicates the third communication channel. The storage medium stores the received third communication channel information. The controller wirelessly transmits the first communication channel information stored in the storage medium and the received third communication channel information to the second wireless communication terminal through the fourth communication channel using the communicator.

According to a second aspect of the present invention, in the first aspect, the controller may wirelessly receive the second communication channel information from the second wireless communication terminal by means of a public action frame defined by IEEE 802.11 using the communicator. The controller may wirelessly transmit the first communication channel information and the second communication channel information to the third wireless communication terminal by means of the public action frame using the communicator. The controller may wirelessly receive the third communication channel information from the third wireless communication terminal by means of the public action frame using the communicator. The controller may wirelessly transmit the first communication channel information and the third communication channel information to the second wireless communication terminal by means of the public action frame using the communicator.

According to a third aspect of the present invention, in the first aspect, in a predetermined first period, the controller may set a plurality of predetermined communication channels in the communicator sequentially as the fourth communication channel. In the first period, the controller may wirelessly receive second timing information from the second wireless communication terminal using the communicator and may wirelessly receive third timing information from the third wireless communication terminal using the communicator. The second timing information may indicate a timing at which the second wireless communication terminal wirelessly transmits the second communication channel information. The third timing information may indicate a timing at which the third wireless communication terminal wirelessly transmits the third communication channel information. The storage medium may store the received second timing information and the received third timing information. The controller may determine a starting timing of a second period later than the first period on the basis of at least one of the received second timing information and the received third timing information. The controller may maintain the fourth communication channel set in the communicator in the second period, after the controller sets the fourth communication channel in the communicator. In the second period, the controller may wirelessly receive the second communication channel information from the second wireless communication terminal using the communicator and may wirelessly receive the third communication channel information from the third wireless communication terminal using the communicator. In the second period, the controller may wirelessly transmit the first communication channel information and the second communication channel information to the third wireless communication terminal using the communicator and may wirelessly transmit the first communication channel information and the third communication channel information to the second wireless communication terminal using the communicator.

According to a fourth aspect of the present invention, in the third aspect, the fourth communication channel may include a fifth communication channel and a sixth communication channel different from the fifth communication channel. In the second period, the controller may perform wireless transmission of the first communication channel information, the second communication channel information, and the third communication channel information through the fifth communication channel and the sixth communication channel.

According to a fifth aspect of the present invention, in the third aspect, in the second period, the controller may wirelessly receive the second communication channel information a plurality of times from the second wireless communication terminal using the communicator and may wirelessly receive the third communication channel information a plurality of times from the third wireless communication terminal using the communicator. In the second period, the controller may wirelessly transmit the first communication channel information and the second communication channel information a plurality of times to the third wireless communication terminal using the communicator and may wirelessly transmit the first communication channel information and the third communication channel information a plurality of times to the second wireless communication terminal using the communicator.

According to a sixth aspect of the present invention, in the first aspect, the communicator may include a first communicator and a second communicator different from the first communicator. The controller may set the first communication channel in the first communicator. The controller may set the fourth communication channel in the second communicator. The controller may wirelessly receive a plurality of frames of images continuously from a terminal in the first wireless LAN using the first communicator. In a third period, the controller may inhibit wireless transmission of the first communication channel information, the second communication channel information, and the third communication channel information using the second communicator. The first period may be a period from the start to the completion of the wireless reception of one frame of images. In a fourth period, the controller may perform wireless transmission of the second communication channel information, the third communication channel information, and the first communication channel information using the second communicator. The fourth period may be a period from the completion of the wireless reception of one frame of images to the start of the wireless reception of the next one frame of images.

According to a seventh aspect of the present invention, in the first aspect, the fourth communication channels used for wireless communication of the first communication channel information, the fourth communication channels used for wireless communication of the second communication channel information, and the fourth communication channels used for wireless communication of the third communication channel information may be the same.

According to an eighth aspect of the present invention, a wireless communication method includes a first step, a second step, a third step, and a fourth step executed by a wireless communication terminal. The wireless communication terminal belongs to a first wireless LAN (local area network). A first communication channel is used when communication is performed in the first wireless LAN. A second communication channel is used when communication is performed in a second wireless LAN different from the first wireless LAN. A third communication channel is used when communication is performed in a third wireless LAN different from the first wireless LAN and different from the second wireless LAN. A fourth communication channel is used when communication is performed between the first wireless LAN, the second wireless LAN, and the third wireless LAN. In the first step, second communication channel information is wirelessly received from a second wireless communication terminal through the fourth communication channel, and the received second communication channel information is stored in a storage medium. The second communication channel information indicates the second communication channel. The second wireless communication terminal belongs to the second wireless LAN. In the second step, first communication channel information stored in advance in the storage medium and the received second communication channel information are wirelessly transmitted to a third wireless communication terminal through the fourth communication channel. The third wireless communication terminal belongs to the third wireless LAN. In the third step, third communication channel information is wirelessly received from the third wireless communication terminal through the fourth communication channel, and the received third communication channel information is stored in the storage medium. The third communication channel information indicates the third communication channel. In the fourth step, the first communication channel information stored in the storage medium and the received third communication channel information are wirelessly transmitted to the second wireless communication terminal through the fourth communication channel.

According to a ninth aspect of the present invention, a non-transitory computer-readable recording medium saves a program for causing a computer of a wireless communication terminal to execute a first step, a second step, a third step, and a fourth step. The wireless communication terminal belongs to a first wireless LAN (local area network). A first communication channel is used when communication is performed in the first wireless LAN. A second communication channel is used when communication is performed in a second wireless LAN different from the first wireless LAN. A third communication channel is used when communication is performed in a third wireless LAN different from the first wireless LAN and different from the second wireless LAN. A fourth communication channel is used when communication is performed between the first wireless LAN, the second wireless LAN, and the third wireless LAN. In the first step, second communication channel information is wirelessly received from a second wireless communication terminal through the fourth communication channel, and the received second communication channel information is stored in a storage medium. The second communication channel information indicates the second communication channel. The second wireless communication terminal belongs to the second wireless LAN. In the second step, first communication channel information stored in advance in the storage medium and the received second communication channel information are wirelessly transmitted to a third wireless communication terminal through the fourth communication channel. The third wireless communication terminal belongs to the third wireless LAN. In the third step, third communication channel information is wirelessly received from the third wireless communication terminal through the fourth communication channel, and the received third communication channel information is stored in the storage medium. The third communication channel information indicates the third communication channel. In the fourth step, the first communication channel information stored in the storage medium and the received third communication channel information are wirelessly transmitted to the second wireless communication terminal through the fourth communication channel.

BRIEF DESCRIPTION OF THE DRAWINGS

FIG. 3 is a diagram showing a configuration of a PSDU in the public action frame in the first embodiment of the present invention.

FIG. 15 is a diagram showing a channel table according to the first embodiment of the present invention.

FIG. 17 is a diagram showing a channel table according to a second modification of the first embodiment of the present invention.

DETAILED DESCRIPTION OF THE INVENTION

Embodiments of the present invention will be described with reference to the drawings.

First Embodiment

Figure 1:
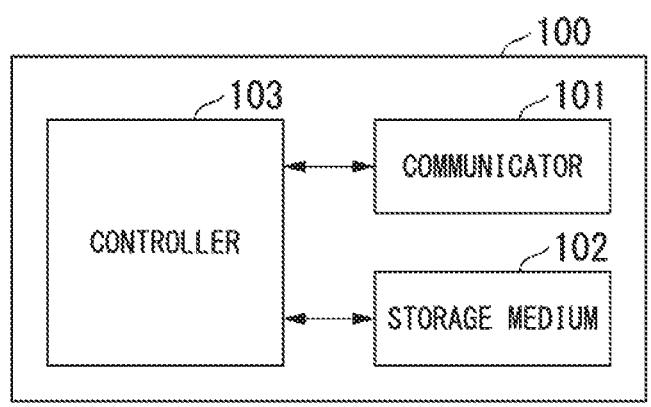
FIG. 1 is a block diagram showing a configuration of a wireless communication terminal according to a first embodiment of the present invention.

FIG. 1 shows a configuration of a wireless communication terminal 100 according to a first embodiment of the present invention. As shown in FIG. 1, the wireless communication terminal 100 includes a communicator 101, a storage medium 102, and a controller 103.

A schematic configuration of the wireless communication terminal 100 will be described. The wireless communication terminal 100 belongs to a first wireless local area network (LAN). A first communication channel is used in the first wireless LAN. A second communication channel is used in a second wireless LAN different from the first wireless LAN. A third communication channel is used in a third wireless LAN which is different from the first wireless LAN and is different from the second wireless LAN. A fourth communication channel is used when communication is performed between the first, second, and third wireless LANs. The storage medium 102 stores first communication channel information indicating the first communication channel. The controller 103 wirelessly receives second communication channel information from a second wireless communication terminal through the fourth communication channel using the communicator 101. The second communication channel information indicates the second communication channel. The second wireless communication terminal belongs to the second wireless LAN. The storage medium 102 stores the received second communication channel information.

The controller 103 wirelessly transmits the first communication channel information stored in the storage medium 102 and the received second communication channel information to a third wireless communication terminal through the fourth communication channel using the communicator 101. The third wireless communication terminal belongs to the third wireless LAN. The controller 103 wirelessly receives the third communication channel information from the third wireless communication terminal through the fourth communication channel using the communicator 101. The third communication channel information indicates the third communication channel. The storage medium 102 stores the received third communication channel information. The controller 103 wirelessly transmits the first communication channel information stored in the storage medium 102 and the received third communication channel information to the second wireless communication terminal through the fourth communication channel using the communicator 101.

The wireless communication terminal 100 can communicate directly with the second and third wireless communication terminals. The second and third wireless communication terminals may be sometimes unable to communicate directly with each other.

A plurality of wireless communication terminals belonging to the first wireless LAN perform wireless communication with each other through the first communication channel. A plurality of wireless communication terminals belonging to the second wireless LAN perform wireless communication with each other through the second communication channel. A plurality of wireless communication terminals belonging to the third wireless LAN perform wireless communication with each other through the third communication channel. A plurality of wireless communication terminals belonging to different wireless LANs perform wireless communication with each other through the fourth communication channel. At least two of the first, second, third, and fourth communication channels may be the same channels. The fourth communication channels used in wireless communication of the first, second, and third communication channel information may be the same channels.

The controller 103 wirelessly receives the second communication channel information from the second wireless communication terminal by means of the public action frame defined by IEEE 802.11 using the communicator 101. The controller 103 wirelessly transmits the first communication channel information and the second communication channel information to the third wireless communication terminal by means of the public action frame using the communicator 101. The controller 103 wirelessly receives the third communication channel information from the third wireless communication terminal by means of the public action frame using the communicator 101. The controller 103 wirelessly transmits the first communication channel information and the third communication channel information to the second wireless communication terminal by means of the public action frame using the communicator 101. In the following description, the public action frame will be abbreviated as PAF.

As described above, the third wireless communication terminal can acquire the first communication channel information and the second communication channel information from the wireless communication terminal 100. Therefore, even when the third wireless communication terminal cannot communicate directly with the second wireless communication terminal, the third wireless communication terminal can acquire information on the second wireless communication terminal. Moreover, the second wireless communication terminal can acquire the first communication channel information and the third communication channel information from the wireless communication terminal 100. Therefore, even when the second wireless communication terminal cannot communicate directly with the third wireless communication terminal, the second wireless communication terminal can acquire information on the third wireless communication terminal. Therefore, information on communication channels used by a first terminal and a second terminal which belong to different wireless LANs and cannot communicate directly with each other can be shared between the first and second terminals.

A detailed configuration of the wireless communication terminal 100 will be described. A plurality of wireless communication terminals used in the description of the first embodiment have a configuration similar to that of the wireless communication terminal 100.

For example, the communicator 101 (a wireless device) is a wireless LAN module. The communicator 101 includes an antenna. Alternatively, the communicator 101 and the antenna may be constituted separately and the communicator 101 may be connected to the antenna. The communicator 101 performs wireless communication with other wireless communication terminals through a communication channel (wireless channel) set by the controller 103. In this way, the communicator 101 receives communication channel information from other wireless communication terminals and transmits communication channel information to other wireless communication terminals.

The storage medium 102 is a volatile or nonvolatile storage device. For example, the storage medium 102 may be at least one of a random access memory (RAM), a dynamic random access memory (DRAM), a static random access memory (SRAM), an erasable programmable read only memory (EPROM), an electrically erasable programmable read-only memory (EEPROM), a NAND flash memory, and a NOR flash memory. The storage medium 102 stores the first communication channel information, the second communication channel information, and the third communication channel information.

The controller 103 (a control unit) is constituted as at least one of a processor and a logical circuit. For example, the processor is at least one of a central processing unit (CPU), a digital signal processor (DSP), and a graphics processing unit (GPU). For example, the logical circuit is at least one of an application specific integrated circuit (ASIC) and a field-programmable gate array (FPGA). The controller 103 can include one or a plurality of processors. The controller 103 can include one or a plurality of logical circuits. The controller 103 operates according to a program stored in a ROM (not shown). In this way, the controller 103 controls an operation of the wireless communication terminal 100.

For example, the function of the controller 103 can be realized as a function of software when the controller 103 reads a program including commands that define the operation of the controller 103 from the storage medium 102 and executes the program. This program may be provided by a "computer-readable storage medium" such as a flash memory, for example. Moreover, the above-described program may be transmitted from a computer having a storage device or the like having this program stored therein to the wireless communication terminal 100 via a transmission medium or via transmission waves in a transmission medium. The "transmission medium" for transmitting the program is a medium having an information transmitting function like a network (a communication line) such as the Internet or a communication circuit (a communication line) such as a telephone circuit. Moreover, the above-described program may realize a part of the above-described function. Furthermore, the above-described program may be a differential file (a differential program) that can realize the above-described function in a combination with a program which is already recorded on a computer.

The controller 103 transmits information to other wireless communication terminals using the communicator 101. Specifically, the controller 103 controls the communicator 101 so that information is transmitted to other wireless communication terminals. That is, the controller 103 causes the communicator 101 to transmit information to other wireless communication terminals. In this way, the communicator 101 transmits information to other wireless communication terminals. The controller 103 receives information from other wireless communication terminals using the communicator 101. Specifically, the controller 103 controls the communicator 101 so that information is received from other wireless communication terminals. That is, the controller 103 causes the communicator 101 to receive information transmitted from other wireless communication terminals. In this way, the communicator 101 receives information from other wireless communication terminals.

The PAF is configured so that the PAF can be received and transmitted between different networks (that is, different basic service sets (BSSs)). The PAF is defined by IEEE 802.11.

Figure 2:
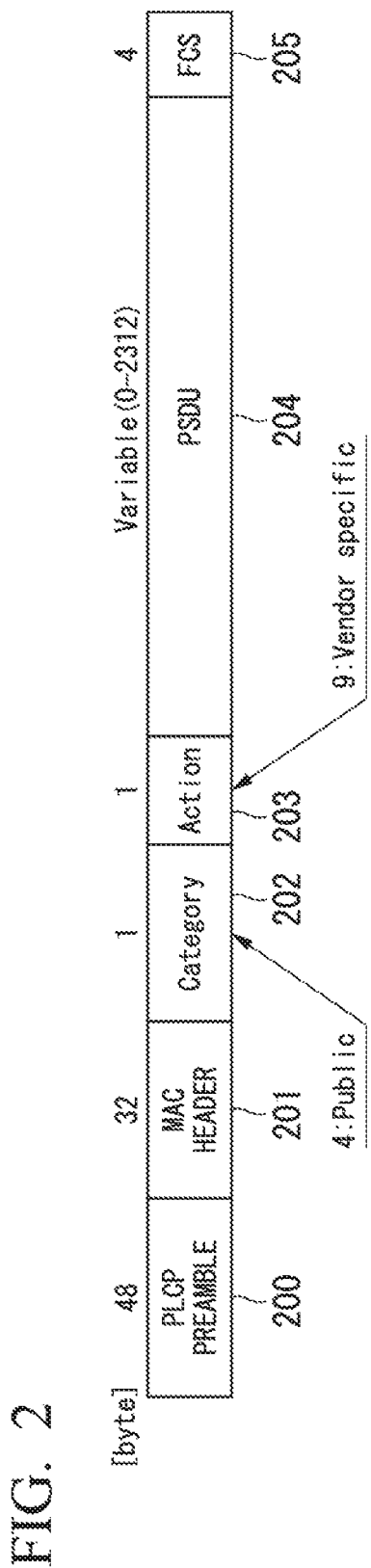
FIG. 2 is a diagram showing a configuration of a public action frame in the first embodiment of the present invention.

FIG. 2 shows a configuration of the PAF. A physical layer convergence protocol (PLCP) preamble 200 which is a physical header is appended at the start of a packet. After that, a media access control (MAC) header 201, a category field 202, an action field 203, a physical layer service data unit (PSDU) 204, and a frame check sequence (FCS) 205 are appended. Detailed description thereof will be omitted. A packet in which "4" is set to the category field 202 is a "public" frame. A vendor specific code is set to the action field 203. In the example shown in FIG. 2, the vendor specific code is "9".

Information on an own terminal and other terminals is stored in the PSDU 204. FIG. 3 shows a configuration of the PSDU 204. The PSDU 204 includes own terminal information 300 and shared information 301. The own terminal information 300 includes information on a wireless communication terminal that has transmitted the PAF. The shared information 301 includes information that the wireless communication terminal having transmitted the PAF has acquired from other wireless communication terminals.

The own terminal information 300 includes a MAC address of an own terminal, a synchronization group, synchronization time information, a global sequence number, connection destination information, a main channel, a PAF channel, a latest PER, HOP1 information, a synchronization switching request, and a reserved area.

The MAC address of the own terminal is a unique address assigned to the communicator 101 of the own terminal. The synchronization group is a MAC address of another wireless communication terminal synchronized with the own terminal. When only the own terminal is present, or when the own terminal and the other wireless communication terminal are synchronized using the own terminal as a reference, the MAC address of the own terminal is stored in the synchronization group.

The synchronization time information is time information indicating the timing at which the next transmission and reception of the PAF starts in the own terminal. The timing may be defined with reference to the timing of a process executed before communication of the PAF. For example, a passive scan may be performed. In a passive scan, communication channels that the own terminal can use are set sequentially, and beacon and wireless signals are detected in the respective communication channels. The timing at which transmission and reception of the PAF starts may be defined with reference to the timing at which the passive scan starts or ends.

The synchronization time information corresponds to timing information indicating the timing at which the own terminal wirelessly transmits communication channel information. The synchronization time information included in the PAF received by the wireless communication terminal 100 indicates a transmission timing (second timing information or third timing information) of the communication channel information in a wireless communication terminal (the second wireless communication terminal or the third wireless communication terminal) having transmitted the PAF.

The global sequence number is a value that is incremented by one for each sequence in which the PAF is transmitted and received. As will be described later, when the global sequence number of the other terminal is not changed for a predetermined period, information on the terminal is erased. The connection destination information indicates whether or not the other terminal connected to a wireless communication terminal having transmitted the PAF is present. For example, the other terminal is present when the connection destination information is "1". The other terminal is not present when the connection destination information is "0".

The main channel indicates a channel that a wireless communication terminal having transmitted the PAF uses for main communication. The main channel included in the PAF received by the wireless communication terminal 100 indicates a communication channel used by the wireless communication terminal (the second wireless communication terminal or the third wireless communication terminal) having transmitted the PAF. That is, the main channel included in the PAF received by the wireless communication terminal 100 corresponds to the second communication channel information or the third communication channel information. The main channel included in the PAF transmitted by the wireless communication terminal 100 indicates a communication channel used by the wireless communication terminal 100. That is, the main channel included in the PAF transmitted by the wireless communication terminal 100 corresponds to the first communication channel information.

The PAF channel indicates a communication channel designated as a communication channel to be used for transmitting the PAF. When the communication channel is designated by the PAF channel, the controller 103 sets the designated communication channel in the communicator 101 and transmits the communication channel information to the other wireless communication terminal by means of the PAF using the communicator 101. The own terminal information 300 need not include the PAF channel. When the communication channel is not designated by the PAF channel or when the PAF channel is not included in the PAF, the controller 103 transmits the communication channel information to the other wireless communication terminal by means of the PAF using the communicator 101 through the communication channel used for receiving the PAF. When the communication channel is not designated by the PAF channel or when the PAF channel is not included in the PAF, the controller 103 may set a communication channel different from the communication channel having received the PAF in the communicator 101. Moreover, when the PAF is transmitted and received between specific devices only, the controller 103 may fix the PAF channel to one or a plurality of specific channels.

The latest packet error rate (PER) is the latest packet error rate information of the wireless communication terminal having transmitted the PAF. When the value is 255, the packet error rate is not measured. The initial value is also 255. The statistical information of the packet error rate in a plurality of periods may be recorded. The HOP1 information indicates the number of other wireless communication terminals detected by the wireless communication terminal having transmitted the PAF. That is, the HOP1 information indicates the number of other wireless communication terminals with which the wireless communication terminal having transmitted the PAF can communicate directly. In the example shown in FIG. 3, the largest value of the HOP1 information is 32 but there is no limitation thereto.

The synchronization switching request is information for instructing the other wireless communication terminal having received the PAF to synchronize with the timing of the wireless communication terminal having transmitted the PAF. For example, when the synchronization switching request is "1", a synchronization instruction is issued. When the synchronization switching request is "0", a synchronization instruction is not issued. When a synchronization instruction is issued by the PAF, the controller 103 updates a synchronization group and the PAF transmission and reception timings of the wireless communication terminal 100. The reserved area is an area in which arbitrary information can be stored.

The shared information 301 includes information on thirty-two wireless communication terminals at most. The information on one wireless communication terminal includes the MAC address of the other terminal, the connection destination information, the main channel, the PAF channel, and the reserved area.

The main channel of the shared information 301 included in the PAF received by the wireless communication terminal 100 indicates information that the wireless communication terminal (the second wireless communication terminal or the third wireless communication terminal) having transmitted the PAF has acquired from the other wireless communication terminal. That is, the main channel of the shared information 301 included in the PAF received by the wireless communication terminal 100 indicates a communication channel used by the other wireless communication terminal that has performed communication with the wireless communication terminal having transmitted the PAF. The main channel of the shared information 301 included in the PAF transmitted by the wireless communication terminal 100 indicates information that the wireless communication terminal 100 has acquired from the other wireless communication terminal (the second wireless communication terminal or the third wireless communication terminal). That is, the main channel of the shared information 301 included in the PAF transmitted by the wireless communication terminal 100 indicates a communication channel used by the other wireless communication terminal that has performed communication with the wireless communication terminal 100. In other words, the main channel of the shared information 301 included in the PAF transmitted by the wireless communication terminal 100 corresponds to the second communication channel information or the third communication channel information.

The configuration of the PAF is not limited to the configuration shown in FIG. 3. The connection destination information, the PAF channel, the latest PER, the HOP1 information, and the reserved area are not essential. As will be described later, synchronization between a plurality of wireless communication terminals is not essential. Due to this, the synchronization group, the synchronization time information, and the synchronization switching request are not essential.

Figure 4:
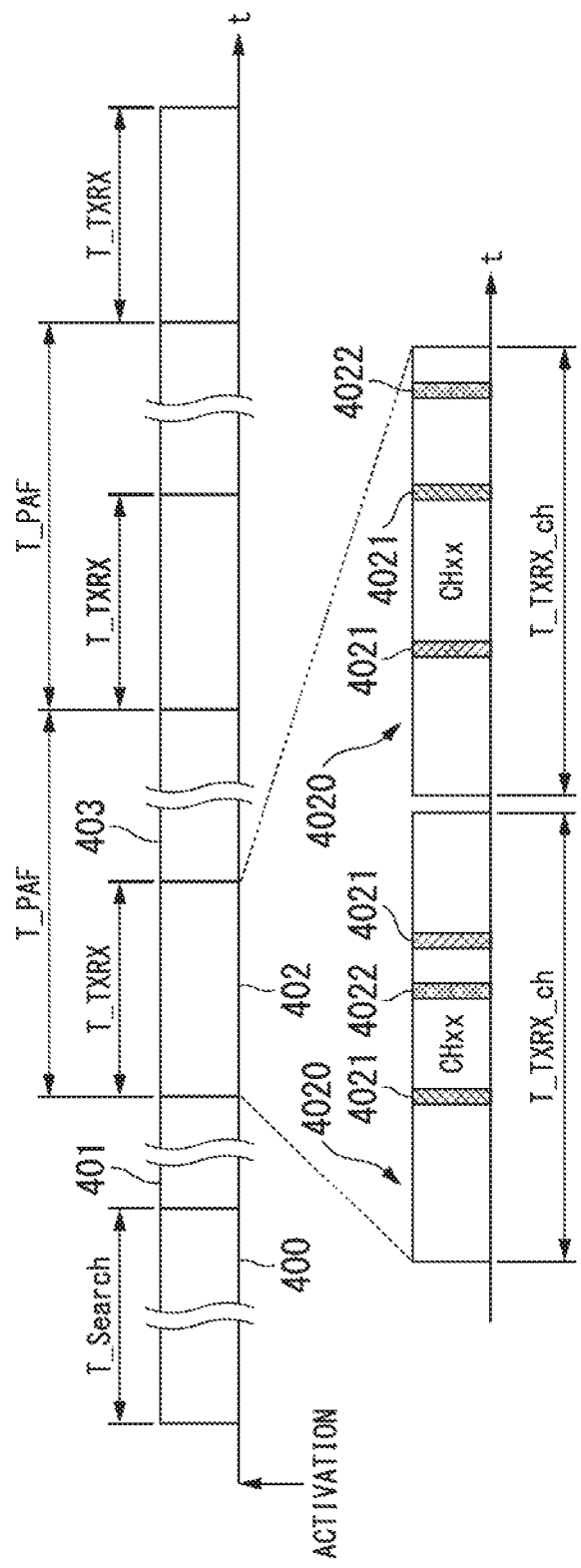
FIG. 4 is a timing chart showing an operation of the wireless communication terminal according to the first embodiment of the present invention.

FIG. 4 shows an example of an operation of the wireless communication terminal 100. The rightward direction in FIG. 4 indicates a direction in which time passes. Some of the period shown in FIG. 4 is omitted due to space limitation of the drawing. By referring to FIG. 4, the operation of the wireless communication terminal 100 will be described.

After the wireless communication terminal 100 is activated, the wireless communication terminal 100 searches for the PAF in a PAF search period 400. In the PAF search period 400, one or more communication channels are sequentially set in the communicator 101, and a period T_Search for receiving the PAF is allocated. A communication channel set in the communicator 101 in the PAF search period 400 is the fourth communication channel. The PAF search period 400 includes one or more timings for each of transmitting and receiving the PAF in at least one communication channel. The period T_Search is a cycle T_PAF or longer.

After the PAF search period 400, the wireless communication terminal 100 can perform communication of information or data other than the PAF in a period 401. For example, the wireless communication terminal 100 can perform communication for establishing connection with other wireless communication terminals. Alternatively, the wireless communication terminal 100 can perform communication of data such as images (videos) and music. A communication channel set in the period 401 is arbitrary. In the period 401, the wireless communication terminal 100 need not perform communication.

When the PAF is received in the PAF search period 400, the controller 103 analyzes the synchronization time information included in the PAF. The controller 103 determines a starting timing and a communication channel of the next PAF communication period 402 and records the determined starting timing and communication channel into the storage medium 102. In the next PAF communication period 402, one communication channel is set in the communicator 101, and a period T_TXRX for receiving the PAF is allocated. When the PAF is received from the same wireless communication terminal through a plurality of channels, the controller 103 records information on the communication channel used for receiving the PAF into the storage medium 102. For example, the controller 103 determines a starting timing of the next PAF communication period 402 on the basis of the content of the latest PAF among a plurality of PAFs received from the same wireless communication terminal.

The controller 103 sets a cycle T_PAF in which the PAF communication period 402 starts on the basis of the synchronization time information. When the wireless communication terminal 100 is not synchronized with other wireless communication terminals, the controller 103 determines the cycle T_PAF on the basis of a fixed value stored in advance. On the other hand, when the PAF is received from the other wireless communication terminal and the cycle T_PAF based on the synchronization time information of the received PAF is set, the cycle T_PAF is identical to the cycle with which the respective wireless communication terminals are synchronized. It cannot be said that the value of the cycle T_PAF is always completely the same. When the cycle T_PAF based on the synchronization time information of the PAF is set, the cycle T_PAF is approximately the same as a fixed value as a result. Moreover, the cycle T_PAF may be set on the basis of the number of terminals indicated by the HOP1 information in HG 3. For example, when the value of the HOP1 information exceeds a predetermined value, the controller 103 may shorten the cycle T_PAF as the value of the HOP1 information increases. That is, when the number of terminals increases, the wireless communication terminal 100 may frequently transmit and receive the PAF. A relational expression between an amount of increase in the value of the HOP1 information and a setting value of the cycle T_PAF is arbitrary. The relational expression may be linear and may be non-linear. The cycle T_PAF is equal to or longer than the period T_TXRX. The wireless communication terminal 100 is synchronized with the other wireless communication terminals until the cycle T_PAF has elapsed from the starting timing of the PAF communication period 402.

In FIG. 4, the detailed state in the PAF communication period 402 is shown on the side below the PAF communication period 402. One PAF communication period 402 includes a plurality of periods 4020 for transmitting and receiving the PAF. In the example shown in FIG. 4, one PAF communication period 402 includes two periods 4020. In each period 4020, one communication channel is set in the communicator 101, and a period T_TXRX_ch for transmitting and receiving the PAF is allocated. In each period 4020, the controller 103 sets a predetermined communication channel in the communicator 101 and performs transmission 4021 and reception 4022 of the PAF using the communicator 101.

The communication channel set in the communicator 101 in the period 4020 is the fourth communication channel. The communication channel set in the communicator 101 in one period 4020 and a communication channel set in the communicator 101 in another period 4020 may be the same or may be different. The communication channel set in the communicator 101 is maintained when the period 4020 continues. In each period 4020, one or more times of transmission 4021 and one or more times of reception 4022 are performed.

When the PAF is received from each of a plurality of wireless communication terminals in the PAF search period 400, the controller 103 may determine a starting timing of the PAF communication period 402 on the basis of the PAF received first. In this case, in the PAF search period 400, the controller 103 may transmit a response to the other wireless communication terminals having transmitted the PAF using the communicator 101. In this response, the PAF including the MAC address information of a wireless communication terminal having transmitted a PAF received earlier may be used.

After the period T_TXRX has elapsed from the starting timing of the PAF communication period 402, the wireless communication terminal 100 can perform communication of information or data other than the PAF in the period 403. In the period 403, the wireless communication terminal 100 need not perform communication.

When the cycle T_PAF has elapsed from the starting timing of the PAF communication period 402, the next PAF communication period 402 starts. The PAF communication period 402 starts whenever the cycle T_PAF has elapsed. The global sequence number in FIG. 3 is incremented by the controller 103 whenever the PAF communication period 402 of one sequence ends.

A mesh network or the like in which a plurality of slaves are connected to one master and the plurality of slaves are completely synchronized is known. In this case, the tuning of transmitting the PAF can be determined by the master itself. Due to this, the PAF search period 400 may be unnecessary. On the other hand, like wireless LAN, when the PAF is transmitted and received between different non-synchronized networks, it is necessary to synchronize periods in which respective terminals transmit and receive the PAF deliberately. In this case, the PAF search period 400 is necessary.

When the PAF is received in the PAF search period 400, the controller 103 determines a communication channel and a starting timing of the PAF communication period 402 on the basis of the information included in the received PAF. The controller 103 sets the determined communication channel in the communicator 101. For example, the communication channel in which the PAF is received in the PAF search period 400 is set in the communicator 101. The controller 103 may set the communication channel in which the PAF is received in the PAF search period 400 and another communication channel different from the communication channel sequentially in the communicator 101. The communication channel designated by the PAF channel included in the received PAF may be set in the communicator 101. When the PAF is not received in the PAF search period 400, the controller 103 determines a PAF communication channel and a starting timing of the PAF communication period 402 independently.

The PAF search period 400, the period 401, and the period 403 are not essential. In the example shown in FIG. 4, one PAF communication period 402 includes two periods 4020. However, one PAF communication period 402 may include only one period 4020.

Figure 5:
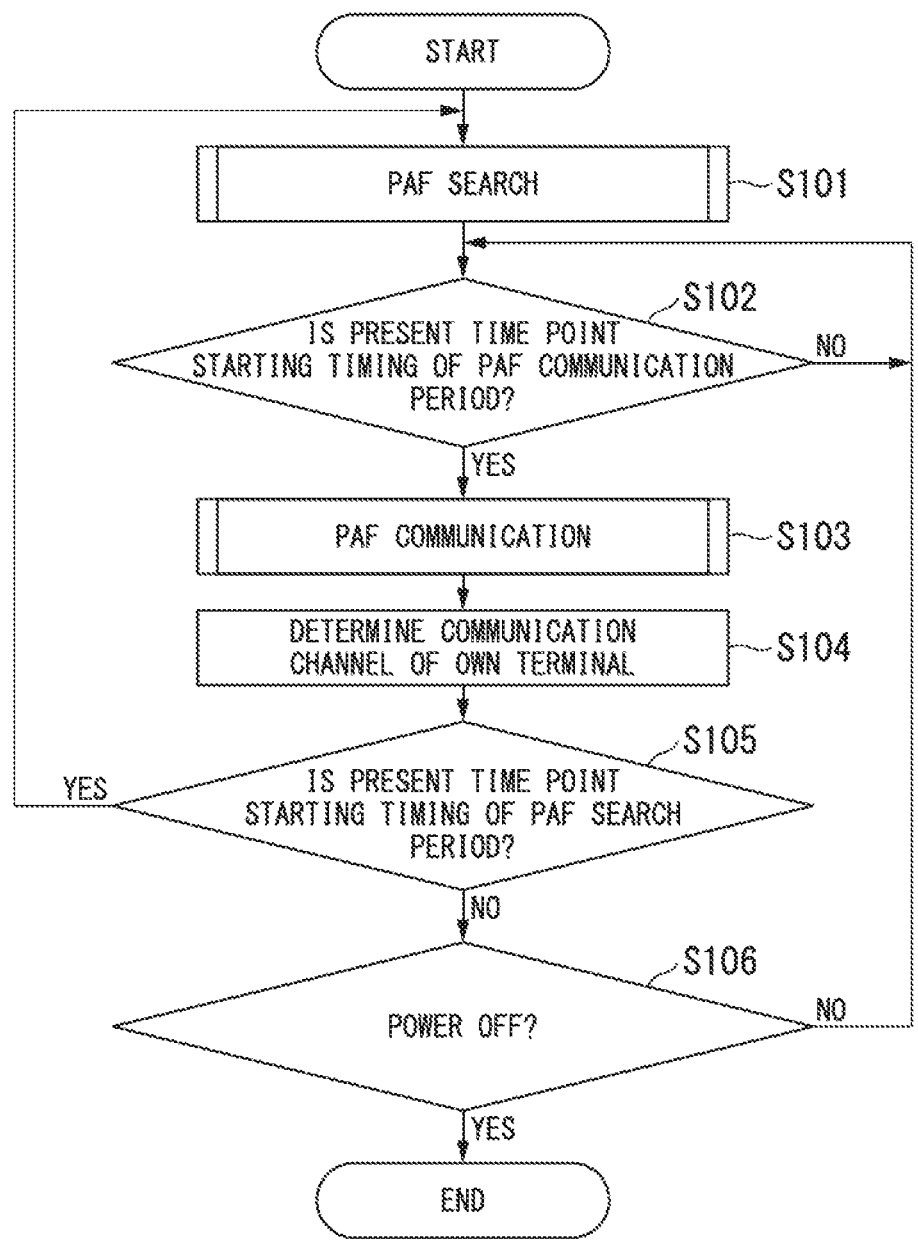
FIG. 5 is a flowchart showing the procedure of a process executed by the wireless communication terminal according to the first embodiment of the present invention.

FIG. 5 shows the procedure of a process executed by the wireless communication terminal 100. Referring to FIG. 5, an operation of the wireless communication terminal 100 will be described.

After the wireless communication terminal 100 is activated, PAF search (step S101) is executed. In the PAF search period 400 shown in FIG. 4, the process of step S101 is executed. The details of the process of step S101 will be described later.

After step S101, the controller 103 determines whether or not a present time point is a starting timing of the PAF communication period 402 (step S102).

When the controller 103 has determined in step S102 that the present time point is not the starting timing of the PAF communication period 402, the determination of step S102 is repeated. When the controller 103 has determined in step S102 that the present time point is the starting timing of the PAF communication period 402, PAF communication (step S103) is executed. In the PAF communication period 402 shown in FIG. 4, the process of step S103 is executed. The details of the process of step S103 will be described later.

After step S103, the controller 103 counts up the global sequence number and determines the communication channel on the basis of the communication channel information included in the PAF received in step S103 (step S104). For example, the controller 103 selects a communication channel which is not used by other wireless communication terminals. In this way, the wireless communication terminal 100 can perform communication through a good communication channel which is not used by other wireless communication terminals. When a communication channel which is not used by other wireless communication terminals is not present, the controller 103 may select a communication channel in which the number of terminals using the communication channel is small. The controller 103 sets the communication channel determined in step S104 in the communicator 101 and performs communication with the other wireless communication terminals using the communicator 101. This communication is performed in the period 403 shown in FIG. 4.

After step S104, the controller 103 determines whether or not the present time point is the starting timing of the PAF search period 400 (step S105).

When the controller 103 has determined in step S105 that the present time point is the starting timing of the PAF search period 400, the process of step S101 is executed. By executing PAF search periodically, the wireless communication terminal 100 can cope with changes of the environment in the own terminal and the other terminals. When the controller 103 has determined in step S105 that the present time point is not the starting timing of the PAF search period 400, the controller 103 determines whether or not the power is to be turned off (step S106).

For example, in step S106, the controller 103 determines whether or not a power-off instruction is received from a user. When the controller 103 determines in step S106 that the power is to be turned off, the power of the wireless communication terminal 100 is turned off. When the controller 103 determines in step S106 that the power is not to be turned off, the process of step S102 is executed.

The processes of steps S101, S102, S103, S105, and S106 are not essential. When the process of step S101 is not executed, the controller 103 determines the PAF communication channel and the starting timing of the PAF communication period 402 independently before the process of step S102 is executed.

Figure 6:
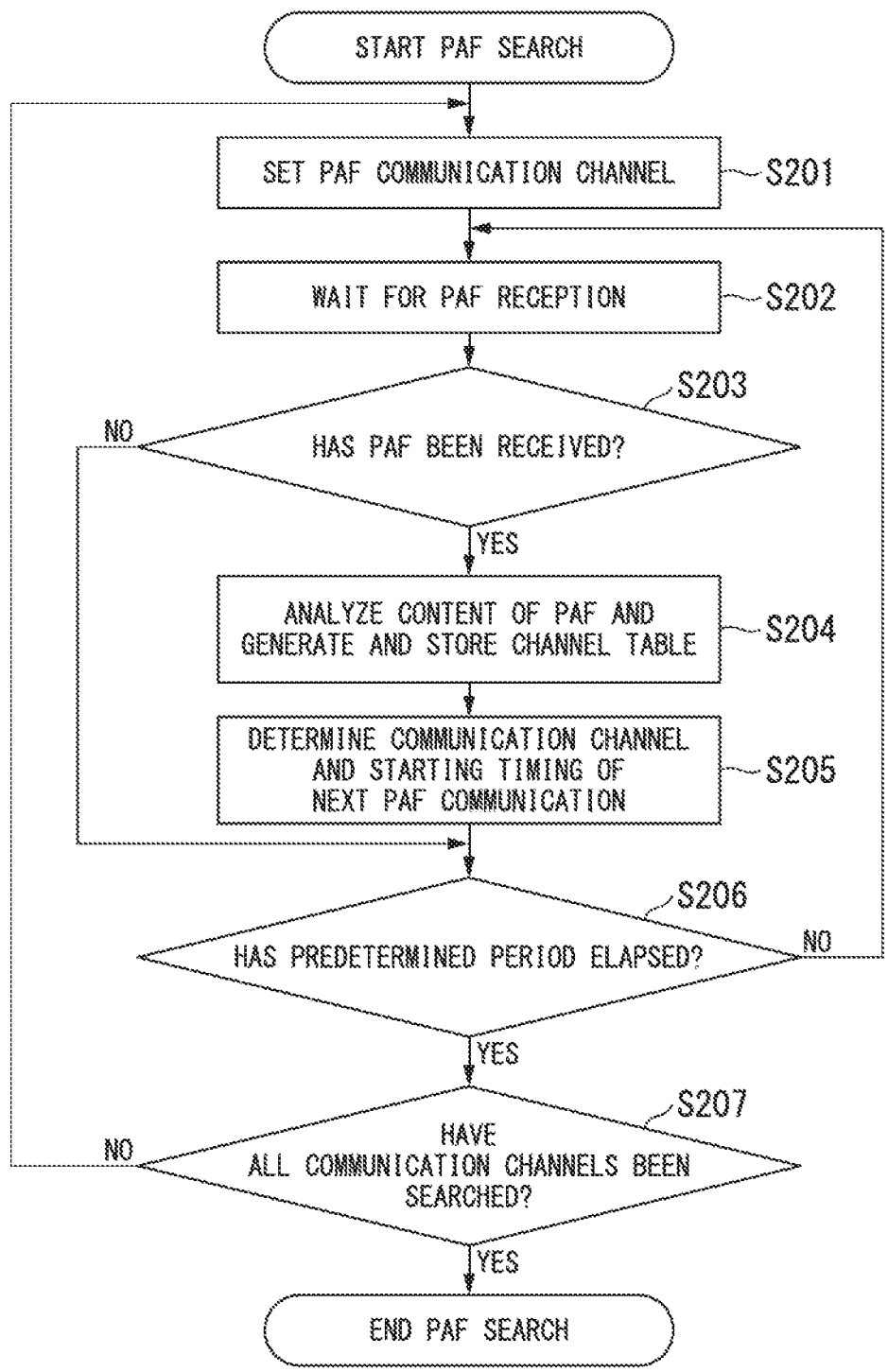
FIG. 6 is a flowchart showing the procedure of a process executed by the wireless communication terminal according to the first embodiment of the present invention.

FIG. 6 shows the procedure of a process of PAF search (step S101). By referring to FIG. 6, the operation of the wireless communication terminal 100 in PAF search will be described.

The controller 103 sets a communication channel for receiving the PAF in the communicator 101 (step S201). When the wireless communication terminal 100 is compatible with a 5-GHz-band wireless LAN, the communication channel may be set to the W52 area which is a non-dynamic frequency selection (DFS) channel, for example.

After step S201, the controller 103 causes the communicator 101 to wait for reception of the PAF. When the PAF is transmitted from other wireless communication terminals through the set PAF communication channel, the controller 103 receives the PAF using the communicator 101 (step S202).

After step S202, the controller 103 determines whether or not the PAF has been received (step S203).

When the controller 103 determines in step S203 that the PAF has not been received, the process of step S206 is executed. When the controller 103 determines in step S203 that the PAF has been received, the controller 103 analyzes the content of the PAF. The controller 103 generates a channel table on the basis of the content of the PAF and records the channel table into the storage medium 102 (step S204).

The channel table includes a main channel and a PAF channel of the wireless communication terminal 100 and the other wireless communication terminal. Moreover, the channel table includes a synchronization group, synchronization time information, a global sequence number, and the like of the wireless communication terminal 100 and the other wireless communication terminal. The information on the other wireless communication terminal recorded in the channel table is included in the received PAF. The information on the wireless communication terminal 100 recorded in the channel table is generated on the basis of information on the other wireless communication terminal. The main channel of the wireless communication terminal 100 recorded in the channel table is a communication channel determined in step S104.

After step S204, the controller 103 determines the starting timing of the PAF communication period 402 on the basis of the synchronization time information of the received PAF. For example, the controller 103 selects the time point indicated by the synchronization time information as the starting timing of the PAF communication period 402. Moreover, the controller 103 determines the communication channel of the PAF to be set in the communicator 101 in the PAF communication period 402. For example, the controller 103 selects a communication channel in which the PAF is received as the communication channel of the PAF to be set in the communicator 101. The controller 103 records the determined communication channel and starting timing of the PAF communication period 402 into the storage medium 102 (step S205). The communication channel determined in step S205 is recorded in the channel table as the PAF channel of the wireless communication terminal 100.

After step S205, the controller 103 determines whether or not a predetermined period allocated to PAF search in one communication channel has elapsed (step S206).

When the controller 103 determines in step S206 that a predetermined period has not elapsed, the process of step S202 is executed. When the controller 103 determines in step S206 that a predetermined period has elapsed, the controller 103 determines whether or not all communication channels that the wireless communication terminal 100 is likely to use have been searched (step S207).

When the controller 103 determines in step S207 that a communication channel which has not been searched is present, the process of step S201 is executed. In step S201, the controller 103 changes the communication channel set in the communicator 101. When the controller 103 determines in step S207 that all communication channels have been searched, the PAF search ends.

Only one communication channel may be set in the communicator 101 in the PAF search. In this case, the process of step S207 is not necessary. In this case, a communication channel that is always the same may be set in the communicator 101.

For example, the PAF search is executed once whenever the cycle T_PAF corresponding to five sequences has elapsed. When the cycle T_PAF for one sequence is approximately 60 seconds, the PAF search is executed once every 300 seconds.

When the PAF is not received from other wireless communication terminals in the PAF search, the controller 103 determines the starting timing and the PAF communication channel of the next PAF communication period 402 independently. For example, the controller 103 determines the starting timing of the next PAF communication period 402 on the basis of a system clock (not shown) of the wireless communication terminal 100. When a new PAF including the synchronization switching request is received in the PAF search executed next, the controller 103 updates the starting timing, the synchronization group, and the communication channel of the next PAF communication period 402.

Figure 7:
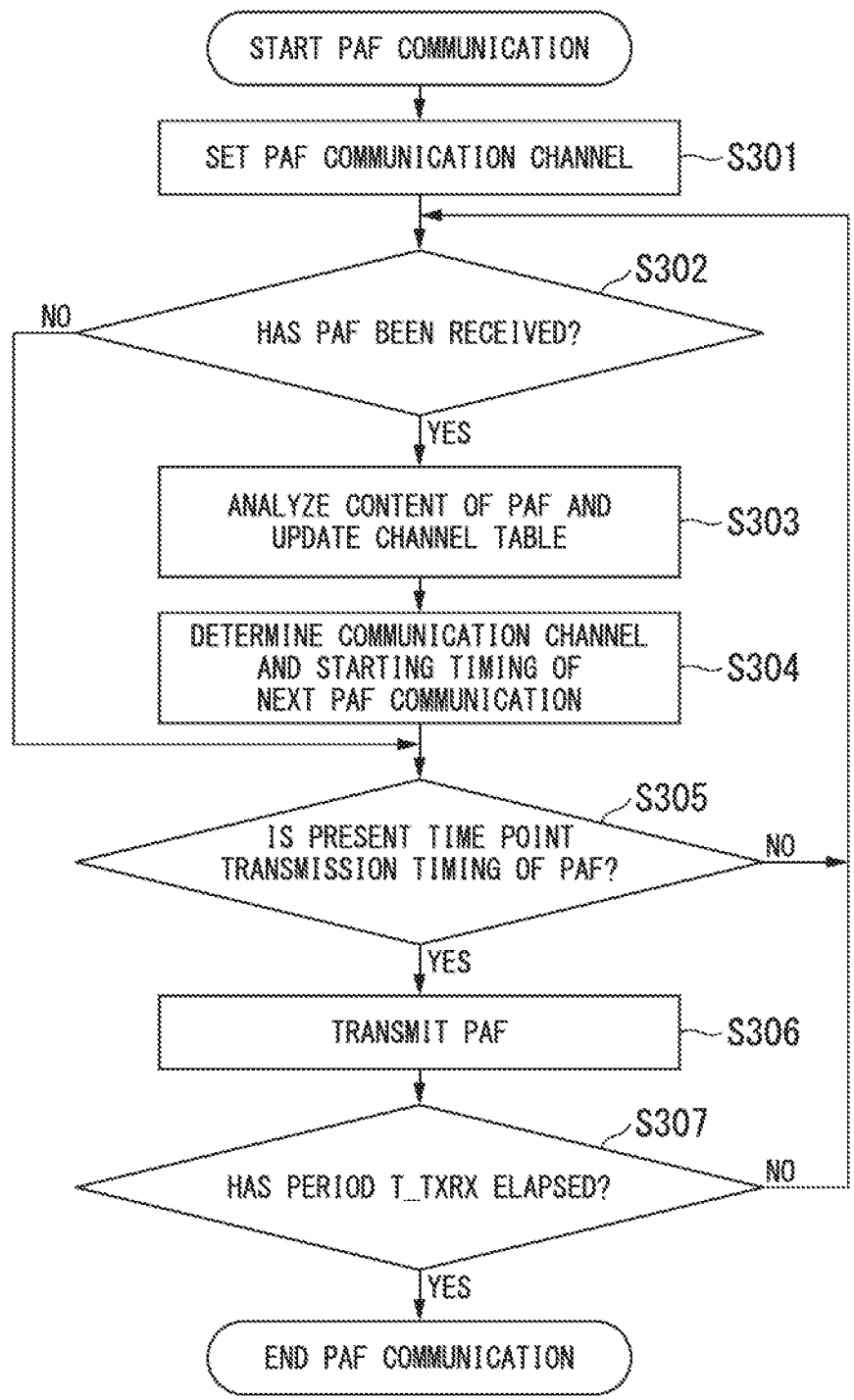
FIG. 7 is a flowchart showing the procedure of a process executed by the wireless communication terminal according to the first embodiment of the present invention.

FIG. 7 shows the procedure of a process of PAF communication (step S103). By referring to FIG. 7, the operation of the wireless communication terminal 100 in PAF communication will be described.

The controller 103 sets a communication channel for transmitting and receiving the PAF in the communicator 101. In this case, the controller 103 sets the communication channel determined in step S205 in the communicator 101 (step S301).

After step S301, the controller 103 monitors the communicator 101. When the PAF is transmitted from the other wireless communication terminal through the set PAF communication channel, the controller 103 receives the PAF using the communicator 101. The controller 103 determines whether or not the PAF has been received (step S302).

When the controller 103 determines in step S302 that the PAF has not been received, the process of step S305 is executed. When the controller 103 determines in step S302 that the PAF has been received, the controller 103 analyzes the content of the PAF. The controller 103 updates the channel table on the basis of the content of the PAF (step S303).

After step S303, the controller 103 determines the starting timing of the next PAF communication period 402 on the basis of the synchronization time information of the received PAF. For example, the controller 103 selects a time point indicated by the synchronization time information as the starting timing of the next PAF communication period 402.

The starting timing of the next PAF communication period 402 is updated whenever the PAF is received. Moreover, the controller 103 determines a PAF communication channel to be set in the communicator 101 in the next PAF communication period 402. For example, the controller 103 selects the communication channel in which the PAF is received as the communication channel to be set in the communicator 101. The controller 103 may select the communication channel designated by the PAF channel included in the PAF as the communication channel to be set in the communicator 101. The controller 103 records the determined starting timing and communication channel of the next PAF communication period 402 into the storage medium 102 (step S304). The communication channel determined in step S304 is recorded in the channel table as the PAF channel of the wireless communication terminal 100.

After step S304, the controller 103 determines whether or not a present time point is a PAF transmission timing (step S305). Immediately after the communication channel of the wireless communication terminal 100 is changed to a channel for PAF communication, there is a possibility that the communication channel of the other wireless communication terminal is not changed to a channel for PAF communication. Due to this, after a predetermined period has elapsed after the communication channel is switched, the wireless communication terminal 100 can transmit the PAF. For example, the predetermined period is 100 ms. The predetermined period is not limited thereto. The PAF transmission timing is a timing that occurs after the elapse of a predetermined period after the communication channel is set in step S301.

When the controller 103 determines in step S305 that the present time point is not the PAF transmission timing, the process of step S302 is executed. When the controller 103 determines in step S305 that the present time point is the PAF transmission timing, the controller 103 transmits the PAF to the other wireless communication terminal using the communicator 101. For example, the information shown in FIG. 3 is extracted from the channel table and is stored in the PAF. For example, the PAF is transmitted by broadcasting. The PAF may be transmitted by multicast addressed to a predetermined group (step S306).

After step S306, the controller 103 determines whether or not the period T_TXRX has elapsed from the starting timing of the PAF communication period 402. That is, the controller 103 determines whether or not the PAF communication period 402 has ended (step S307).

When the controller 103 determines in step S307 that the period T_TXRX has not elapsed (that is, the PAF communication period 402 has not ended), the process of step S302 is executed. When the controller 103 determines in step S307 that the period T_TXRX has elapsed (that is, the PAF communication period 402 has ended), the PAF communication ends.

When the communication channel set in the communicator 101 before step S301 was performed is used for PAF communication, the process of step S301 is not necessary. The order of the processes shown in FIG. 7 may be changed. For example, after the process of step S301 is executed, the processes of steps S305 and S306 may be executed. After the process of step S306 is executed, the processes of steps S302 to S304 may be executed. That is, the processes of steps S305 and S306 may be executed before the processes of steps S302 to S304 are executed.

For example, in one PAF communication period 402, transmission and reception of PAF each are performed at least once. As described above, transmission and reception of PAF may be performed a plurality of times in one PAF communication period 402.

The PAF includes synchronization group information of the wireless communication terminal that has transmitted the PAF. When the wireless communication terminal 100 having received the PAF adjusts a synchronization state on the basis of the PAF, the wireless communication terminal 100 updates the synchronization group thereof. When the wireless communication terminal 100 has received the PAF including information on the same synchronization group as the synchronization group of the wireless communication terminal 100, the wireless communication terminal 100 does not need to adjust the synchronization state. However, when a shift between the timing indicated by the synchronization time information included in the PAF and the timing in the wireless communication terminal 100 is equal to or larger than a predetermined amount (for example, 500 ms), the wireless communication terminal 100 updates the synchronization time information.

As shown in FIG. 6, in a predetermined PAF search period 400 (a first period), the controller 103 sets a plurality of predetermined communication channels in the communicator 101 sequentially as the fourth communication channel (step S201). In the PAF search period 400, the controller 103 wirelessly receives the second timing information from the second wireless communication terminal using the communicator 101 and wirelessly receives the third timing information from the third wireless communication terminal using the communicator 101 (step S202). The second timing information indicates a timing at which the second wireless communication terminal wirelessly transmits the second communication channel information. The third timing information indicates a timing at which the third wireless communication terminal wirelessly transmits the third communication channel information. When the PAF including the synchronization time information is received, the second timing information and the third timing information are received. The storage medium 102 stores the received second timing information and third timing information (step S204). The controller 103 determines a starting timing of a PAF communication period 402 (a second period) later than the PAF search period 400 on the basis of at least one of the received second and third timing information (step S205).

The controller 103 sets the fourth communication channel in the communicator 101 at the starting timing of the PAF communication period 402 or a timing earlier than the starting timing (step S301). The timing at which the fourth communication channel is set in the communicator 101 may be the timing within the PAF search period 400.

After the controller 103 sets the fourth communication channel in the communicator 101, the controller 103 maintains the communication channel set in the communicator 101 as the fourth communication channel in the PAF communication period 402. In the PAF communication period 402, the controller 103 wirelessly receives the second communication channel information from the second wireless communication terminal using the communicator 101 and wirelessly receives the third communication channel information from the third wireless communication terminal using the communicator 101 (step S302). When the PAF including the main channel is received, the second communication channel information and the third communication channel information are received. In the PAF communication period 402, the controller 103 wirelessly transmits the first communication channel information and the second communication channel information to the third wireless communication terminal using the communicator 101 and wirelessly transmits the first communication channel information and the third communication channel information to the second wireless communication terminal using the communicator 101 (step S306). When the PAF including the main channel of the own terminal information 300 and the main channel of the shared information 301 is transmitted, the first communication channel information, the second communication channel information, and the third communication channel information are transmitted.

In the PAF communication period 402, the controller 103 wirelessly transmits the first timing information to the second wireless communication terminal and the third wireless communication terminal using the communicator 101 (step S306). The first timing information indicates a timing at which the wireless communication terminal 100 wirelessly transmits the first communication channel information, the second communication channel information, and the third communication channel information. When the PAF including the synchronization time information is transmitted, the first timing information is transmitted.

In the PAF search period 400 or the PAF communication period 402, the controller 103 may wirelessly receive the synchronization switching request and the second timing information from the second wireless communication terminal using the communicator 101 (step S202 or S302). When the PAF including the synchronization switching request and the synchronization time information is received, the synchronization switching request and the second timing information are received. When the synchronization switching request and the second timing information are received, the controller 103 determines the starting timing of the PAF communication period 402 on the basis of the second timing information (step S304). When the synchronization switching request and the second timing information are received, the controller 103 may wirelessly transmit the synchronization switching request and the second timing information to the third wireless communication terminal using the communicator 101 in the PAF communication period 402 (step S306). When the synchronization switching request and the second timing information are received in the PAF search period 400, the controller 103 may wirelessly transmit the synchronization switching request and the second timing information to the third wireless communication terminal using the communicator 101 in the PAF search period 400.

In the PAF search period 400 or the PAF communication period 402, the controller 103 may wirelessly receive the synchronization switching request and the third timing information from the third wireless communication terminal using the communicator 101 (step S202 or S302). When the PAF including the synchronization switching request and the synchronization time information is received, the synchronization switching request and the third timing information are received. When the synchronization switching request and the third timing information are received, the controller 103 determines the starting timing of the PAF communication period 402 on the basis of the third timing information (step S304). When the synchronization switching request and the third timing information are received, the controller 103 may wirelessly transmit the synchronization switching request and the third timing information to the second wireless communication terminal using the communicator 101 in the PAF communication period 402 (step S306). When the synchronization switching request and the third timing information are received in the PAF search period 400, the controller 103 may wirelessly transmit the synchronization switching request and the third timing information to the second wireless communication terminal using the communicator 101 in the PAF search period 400.

In one PAF communication period 402, the controller 103 wirelessly receives the second communication channel information from the second wireless communication terminal using the communicator 101 and wirelessly receives the third communication channel information from the third wireless communication terminal using the communicator 101 (step S202). In one PAF communication period 402, the controller 103 may wirelessly receive the second communication channel information a plurality of times from the second wireless communication terminal using the communicator 101 and may wirelessly receive the third communication channel information a plurality of times from the third wireless communication terminal using the communicator 101.

In one PAF communication period 402, the controller 103 wirelessly transmits the first communication channel information and the second communication channel information to the third wireless communication terminal using the communicator 101 and wirelessly transmits the first communication channel information and the third communication channel information to the second wireless communication terminal using the communicator 101 (step S306). In one PAF communication period 402, the controller 103 may wirelessly transmit the first communication channel information and the second communication channel information a plurality of times to the third wireless communication terminal using the communicator 101 and may wirelessly transmit the first communication channel information and the third communication channel information a plurality of times to the second wireless communication terminal using the communicator 101.

Figure 8:
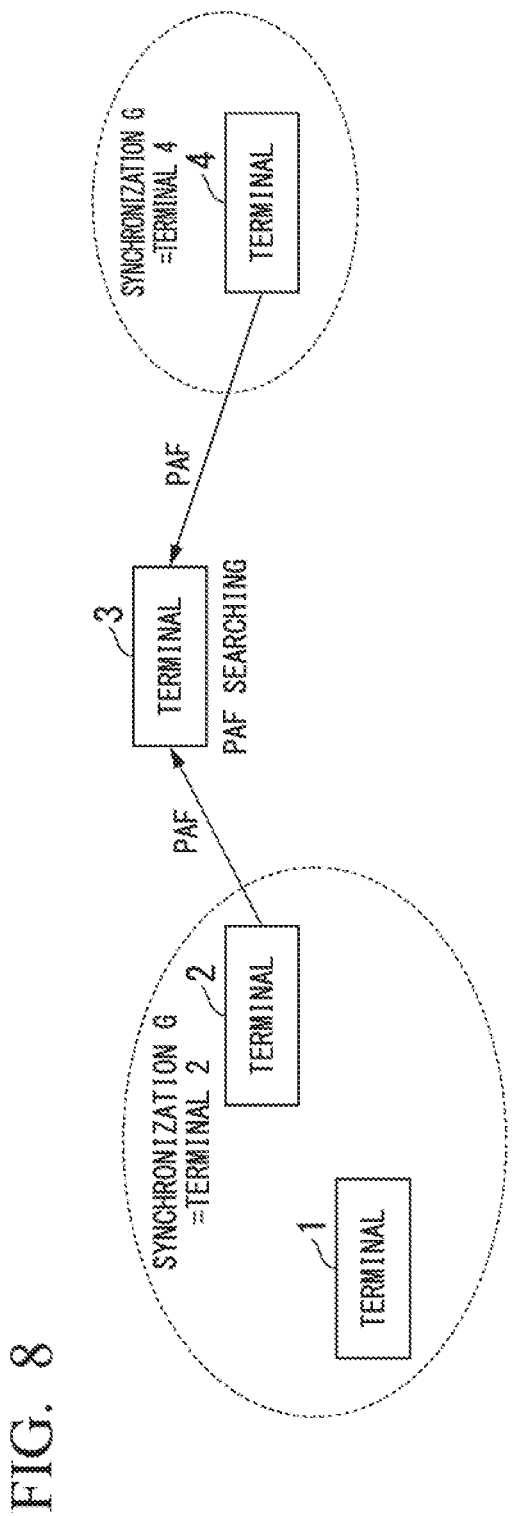
FIG. 8 is a diagram showing a system according to the first embodiment of the present invention.

By referring to FIGS. 8 to 15, an example in which a plurality of wireless communication terminals share information will be described. As shown in FIG. 8, a system in which four terminals are present will be described. Terminals 1, 2, 3, and 4 are constituted similarly to the wireless communication terminal 100. The respective terminals belong to different wireless LANs.

As shown in FIG. 8, the synchronization group of the terminals 1 and 2 is the MAC address of the terminal 2. That is, the terminals 1 and 2 are synchronized. The synchronization group of the terminal 4 is the MAC address of the terminal 4. That is, the terminal 4 is not synchronized with the terminals 1 and 2. The terminal 3 is activated within a communication range of the terminals 2 and 4. When the terminal 3 is activated, the terminal 3 executes PAF search (step S101). In the PAF search period 400, the terminal 3 receives the PAF from the terminal 4. After the PAF is received from the terminal 4, the terminal 3 receives the PAF from the terminal 2. Either one of the terminals 2 and 4 is the second wireless communication terminal, and the other one of the terminals 2 and 4 is the third wireless communication terminal. The communication channel used for receiving the PAF from the terminal 3 and the communication channel used for receiving the PAF from the terminal 4 are the same or different.

Figure 9:
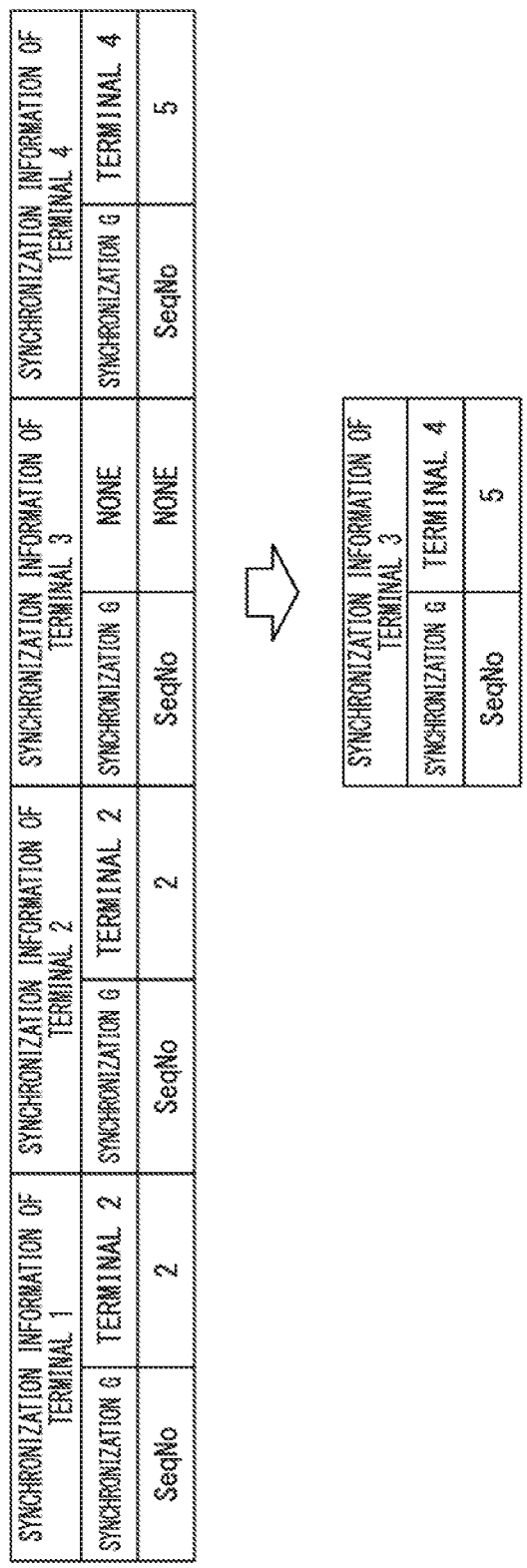
FIG. 9 is a diagram showing a channel table according to the first embodiment of the present invention.

FIG. 9 shows a channel table of respective terminals. In FIG. 9, only a synchronization group (synchronization G) and a global sequence number (SeqNo) that each terminal stores as synchronization information in the channel table are shown. Before the PAF is received, the synchronization group and the global sequence number are not recorded in the channel table of the terminal 3. Therefore, the terminal 3 is not synchronized with any terminal.

For example, the terminal 3 records a synchronization group included in the PAF received first into the synchronization group of the channel table. Moreover, the terminal 3 records a global sequence number included in the PAF received first into the global sequence number of the channel table. That is, the terminal 3 is synchronized with a terminal that has transmitted the PAF received first. Since the PAF from the terminal 4 is received by the terminal 3 before the PAF from the terminal 2 is received by the terminal 3, the terminal 3 is synchronized with the terminal 4. Due to this, the MAC address of the terminal 4 is recorded in the synchronization group of the channel table of the terminal 3.

Figure 10:
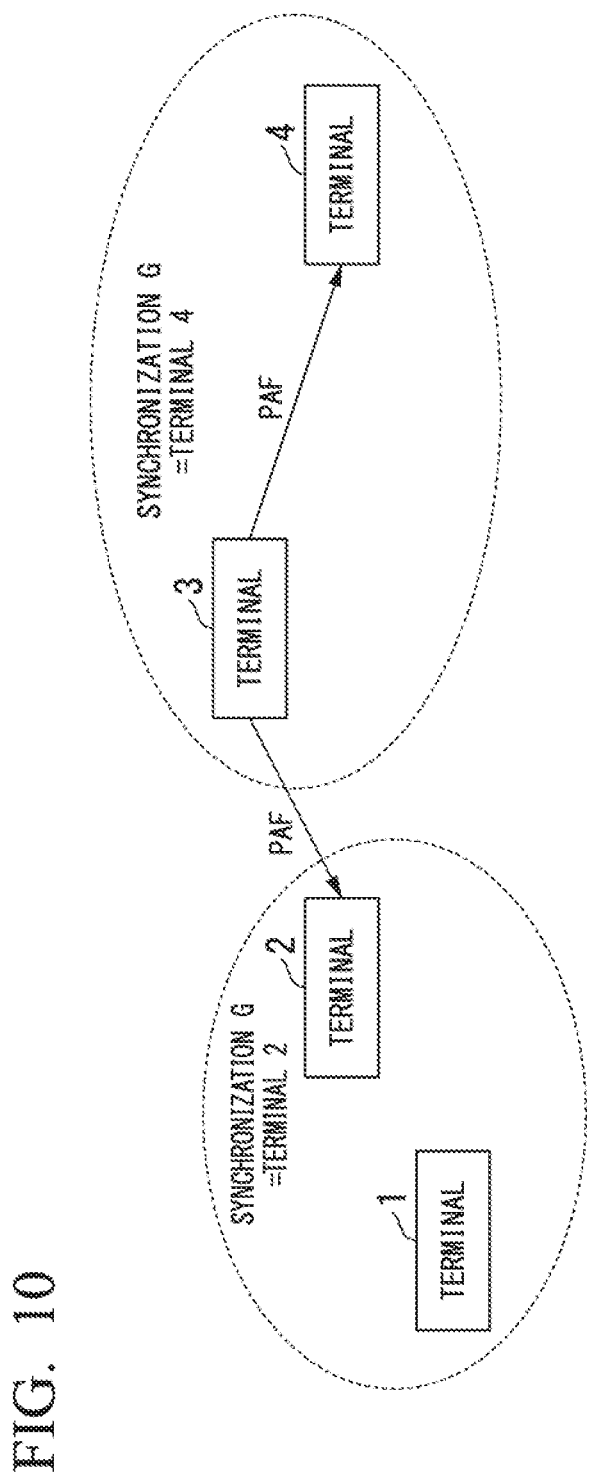
FIG. 10 is a diagram showing the system according to the first embodiment of the present invention.

As shown in FIG. 10, in the PAF communication period 402, the terminal 3 transmits the PAF to the terminals 2 and 4. A communication channel used for transmitting the PAF to the terminal 2 and a communication channel used for transmitting the PAF to the terminal 4 are the same or different. The PAF transmitted to the terminal 2 includes a synchronization switching request and a MAC address of the terminal 4. The terminal 2 receives the PAF and records the synchronization group included in the received PAF into the synchronization group of the channel table. Moreover, the terminal 2 records the global sequence number included in the received PAF into the global sequence number of the channel table.

Figure 11:
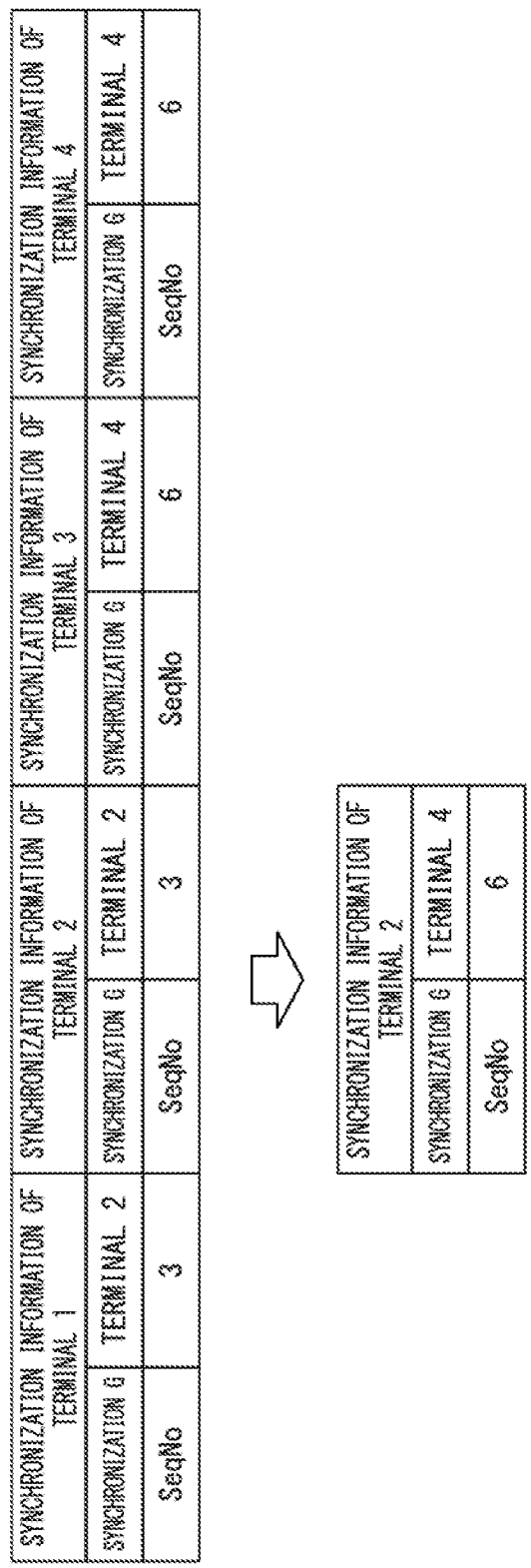
FIG. 11 is a diagram showing a channel table according to the first embodiment of the present invention.

As shown in FIG. 11, the MAC address of the terminal 4 included in the PAF received by the terminal 2 is recorded in the synchronization group of the channel table of the terminal 2. When the PAF communication period 402 of one sequence ends, the global sequence number of each terminal is increased by 1.

Figure 12:
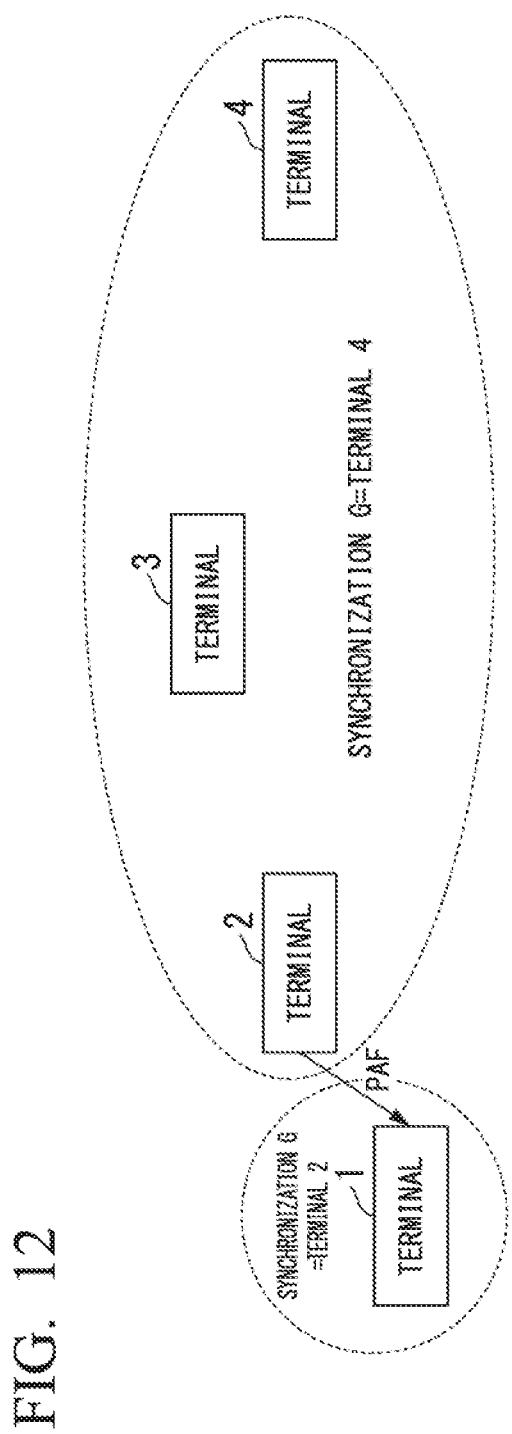
FIG. 12 is a diagram showing the system according to the first embodiment of the present invention.

As shown in FIG. 12, in the next PAF communication period 402, the terminal 2 transmits the PAF including the synchronization switching request and the MAC address of the terminal 4 to the terminal 1. The terminal 1 receives the PAF and records the synchronization group included in the received PAF into the synchronization group of the channel table. Moreover, the terminal 1 records the global sequence number included in the received PAF into the global sequence number of the channel table.

Figure 13:
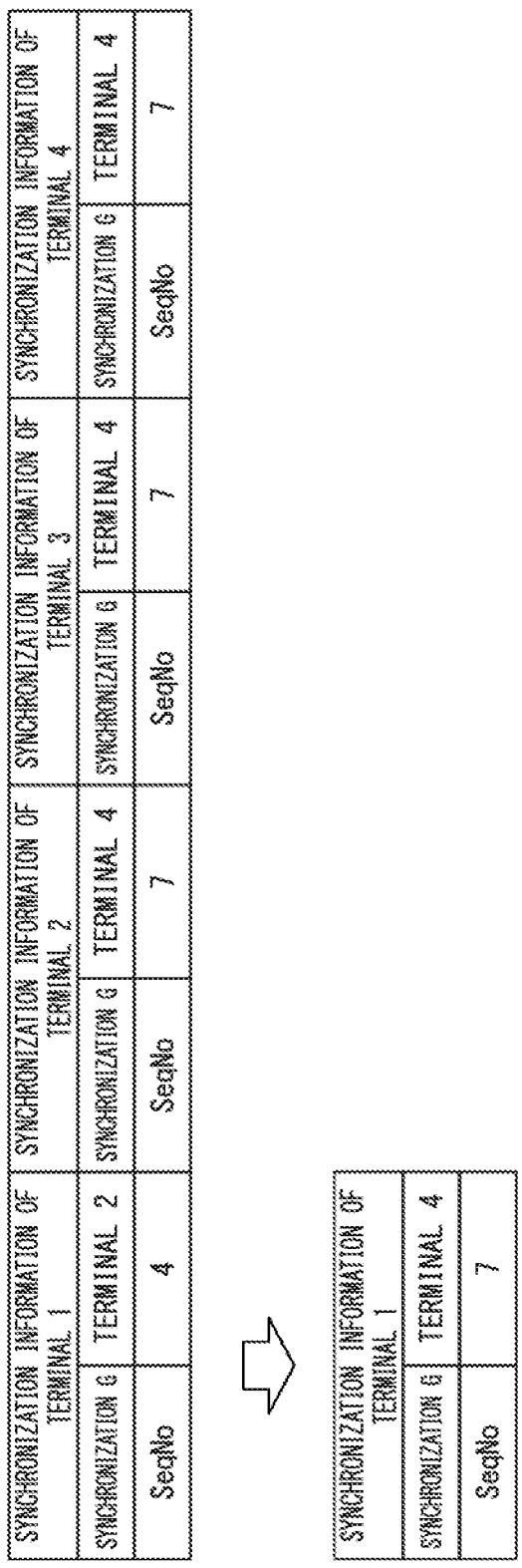
FIG. 13 is a diagram showing a channel table according to the first embodiment of the present invention.

As shown in FIG. 13, the MAC address of the terminal 4 included in the PAF received by the terminal 1 is recorded in the synchronization group of the channel table of the terminal 1. In this way, the synchronization groups of the terminals 1 to 4 are set to the MAC address of the terminal 4, and the terminals 1 to 4 are synchronized (see FIG. 14). When the PAF communication period 402 of one sequence ends, the global sequence number of each terminal is increased by 1.

In the next PAF communication period 402, when the terminal 1 discovers another terminal different from the terminals 2 to 4, the terminal 1 transmits the PAF including the synchronization switching request and the MAC address of the terminal 4 to the other terminal. The terminal receives the PAF and records the synchronization group included in the received PAF into the synchronization group of the channel table. Moreover, the terminal records the global sequence number included in the received PAF into the global sequence number of the channel table. As shown in FIG. 15, when the PAF communication period 402 of one sequence ends, the global sequence number of each terminal is increased by 1.

Synchronization between a plurality of wireless communication terminals is not essential. For example, respective wireless communication terminals may transmit the PAF frequently. The respective wireless communication terminals may transmit the PAF while changing the cycle T_PAF arbitrarily. In this way, even in a system in which a plurality of wireless communication terminals are not synchronized, the possibility that each wireless communication terminal receives the PAF increases.

A wireless communication method of each aspect of the present invention is based on the operations shown in FIGS. 5, 6, and 7. The wireless communication method of each aspect of the present invention includes a first step, a second step, a third step, and a fourth step executed by the wireless communication terminal 100.

In a first step (step S202 or S302), the second communication channel information is wirelessly received from the second wireless communication terminal through the fourth communication channel, and the received second communication channel information is stored in the storage medium 102. In a second step (step S306), the first communication channel information stored in advance in the storage medium 102 and the received second communication channel information are wirelessly transmitted to the third wireless communication terminal through the fourth communication channel. In a third step (step S202 or S302), the third communication channel information is wirelessly received from the third wireless communication terminal through the fourth communication channel, and the received third communication channel information is stored in the storage medium 102. In a fourth step (step S306), the first communication channel information stored in the storage medium 102 and the received third communication channel information are wirelessly transmitted to the second wireless communication terminal through the fourth communication channel.

The wireless communication method of each aspect of the present invention need not include a process other than the processes corresponding to the first, second, third, and fourth steps.

As described above, in the first embodiment, information on communication channels used by a first terminal and a second terminal which belong to different wireless LANs and which cannot communicate directly with each other can be shared between the first and second terminals.

PAF is defined by IEEE 802.11 which is a basic standard of the wireless LAN. A plurality of wireless communication terminals share communication channel information by communicating the PAF. In this way, it is not necessary to add a wireless module of the standard other than the wireless LAN, for acquiring and sharing channel information between different networks.

In the PAF search period 400, the plurality of wireless communication terminals are synchronized by communicating the PAF. When the plurality of wireless communication terminals exchange the communication channel information at the cycles T_PAF, each wireless communication terminal can understand the latest wireless environment around the own terminal. Therefore, each wireless communication terminal can set an appropriate communication channel.

First Modification of First Embodiment

When PAF communication is performed through only one communication channel, if the quality of the communication channel deteriorates, it may be difficult to perform PAF communication. In a first modification of the first embodiment, the wireless communication terminal 100 transmits and receives the PAF using a plurality of communication channels. A communication channel for performing PAF communication may be a communication channel other than DFS channels.

As described above, communication of communication channel information is performed through the fourth communication channel. The fourth communication channel may include a fifth communication channel and a sixth communication channel different from the fifth communication channel. In one PAF communication period 402, the controller 103 may wirelessly receive the first communication channel information, the second communication channel information, and the third communication channel information through the fifth communication channel and the sixth communication channel. In one PAF communication period 402, the controller 103 may wirelessly transmit the first communication channel information, the second communication channel information, and the third communication channel information through the fifth communication channel and the sixth communication channel.

Figure 16:
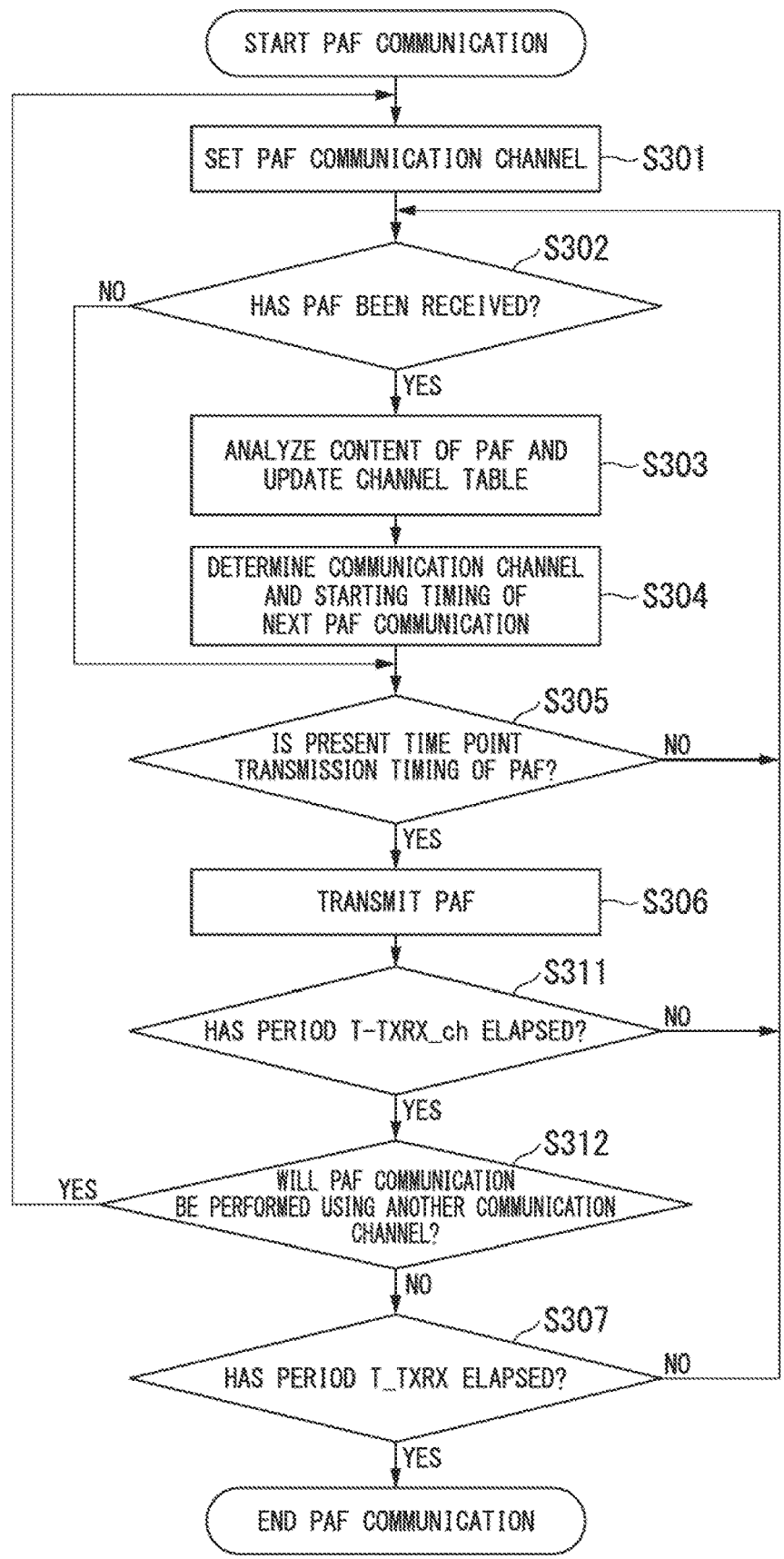
FIG. 16 is a flowchart showing the procedure of a process executed by a wireless communication terminal according to a first modification of the first embodiment of the present invention.

The process shown in FIG. 7 is changed to a process shown in FIG. 16. FIG. 16 shows the procedure of a process in PAF communication (step S103). The difference between the process shown in FIG. 16 and the process shown in FIG. 7 will be described.

After step S306, the controller 103 determines whether or not a period T_TXRX_ch has elapsed from the starting timing of the period 4020 within the PAF communication period 402. That is, the controller 103 determines whether or not the period 4020 has ended (step S311).

When the controller 103 determines in step S311 that the period T_TXRX_ch has not elapsed (that is, the period 4020 has not ended), the process of step S302 is executed. When the controller 103 determines in step S311 that the period T_TXRX_ch has elapsed (that is, the period 4020 has ended), the controller 103 determines whether or not the PAF communication is to be performed through another communication channel (step S312).

When the controller 103 determines in step S312 that PAF communication is to be performed through another communication channel, the process of step S301 is executed. In step S301, the controller 103 changes the communication channel set in the communicator 101. When the controller 103 determines in step S312 that PAF communication is not to be performed through another communication channel, the process of step S307 is executed.

Although the determination in step S311 is performed on the basis of the period T_TXRX_ch, the determination in step S311 may be performed on the basis of the number of times the PAF was transmitted in step S306. The number of times the wireless communication terminal 100 transmits the PAF is arbitrary. For example, in one period 4020, the PAF is transmitted a predetermined number of times at predetermined time intervals. The time intervals for transmitting the PAF may be a random period within a predetermined range. The number of times of transmission of PAF may be determined on the basis of the number of terminals indicated by the HOP1 information included in the PAF. For example, as the number of terminals becomes larger, the number of times of transmission of the PAF becomes larger.

The process shown in FIG. 16 other than the above-described features is the same as the process shown in FIG. 7.

In the above-described process, wireless reception and wireless transmission of the communication channel information in the period 4020 is performed through the fifth communication channel. After the period 4020 ends, wireless reception and wireless transmission of the communication channel information in another period 4020 is performed through the sixth communication channel.

For example, in the PAF search period 400, the respective pieces of communication channel information are received through the fifth communication channel and the sixth communication channel. The controller 103 performs wireless reception and wireless transmission of the respective pieces of communication channel information through the fifth communication channel in the period 4020 within the PAF communication period 402. The controller 103 performs wireless reception and wireless transmission of the respective pieces of communication channel information through the sixth communication channel in another period 4020 within the PAF communication period 402.

Alternatively, the respective pieces of communication channel information and designated channel information indicating the sixth communication channel are received through the fifth communication channel only in the PAF search period 400. The designated channel information is information for designating a communication channel to be used for communicating the communication channel information. For example, the designated channel information is a PAF channel included in the PAF. The controller 103 performs wireless reception and wireless transmission of the respective pieces of communication channel information through the fifth communication channel in the period 4020 within the PAF communication period 402. The controller 103 performs wireless reception and wireless transmission of the respective pieces of communication channel information through the sixth communication channel designated by the designated channel information in another period 4020 within the PAF communication period 402.

Alternatively, when the respective pieces of communication channel information are not received in the PAF search period 400, the controller 103 performs wireless reception and wireless transmission of the respective pieces of communication channel information through a predetermined fifth communication channel in the period 4020 within the PAF communication period 402. The controller 103 performs wireless reception and wireless transmission of the respective pieces of communication channel information through a predetermined sixth communication channel in another period 4020 within the PAF communication period 402.

Even when a communication channel for performing transmission and reception of the PAF is deteriorated, by transmitting and receiving the PAF through a plurality of communication channels, it is possible to reduce failures in transmission and reception of the PAF.

Second Modification of First Embodiment

In a second modification of the first embodiment, when the global sequence number is not updated a predetermined number of times, the controller 103 determines that it is not possible to receive the PAF from the wireless communication terminal associated with the global sequence number. In this case, the controller 103 removes the information on the wireless communication terminal from the channel table. Hereinafter, removal of terminal information will be described.

For example, when the power of a wireless communication terminal is turned off or the wireless communication terminal has moved away from a range where the wireless communication terminal can communicate with the wireless communication terminal 100, it is necessary to remove the information on the wireless communication terminal from the channel table. When it is not possible to receive the PAF from the wireless communication terminal for a predetermined period, the controller 103 removes information on the wireless communication terminal from the channel table.

An example of a specific method will be described. A plurality of wireless communication terminals having the same synchronization group share the global sequence numbers of the respective wireless communication terminals by PAF communication. The global sequence numbers held by the respective wireless communication terminals are counted up every sequence. The counted-up global sequence number is notified to the other wireless communication terminal by the PAF. When a difference between the global sequence number of the other wireless communication terminal and the global sequence number of the wireless communication terminal 100 reaches a predetermined amount, the controller 103 deletes the information on the other wireless communication terminal. For example, the predetermined amount is an amount corresponding to three sequences.

Figure 14:
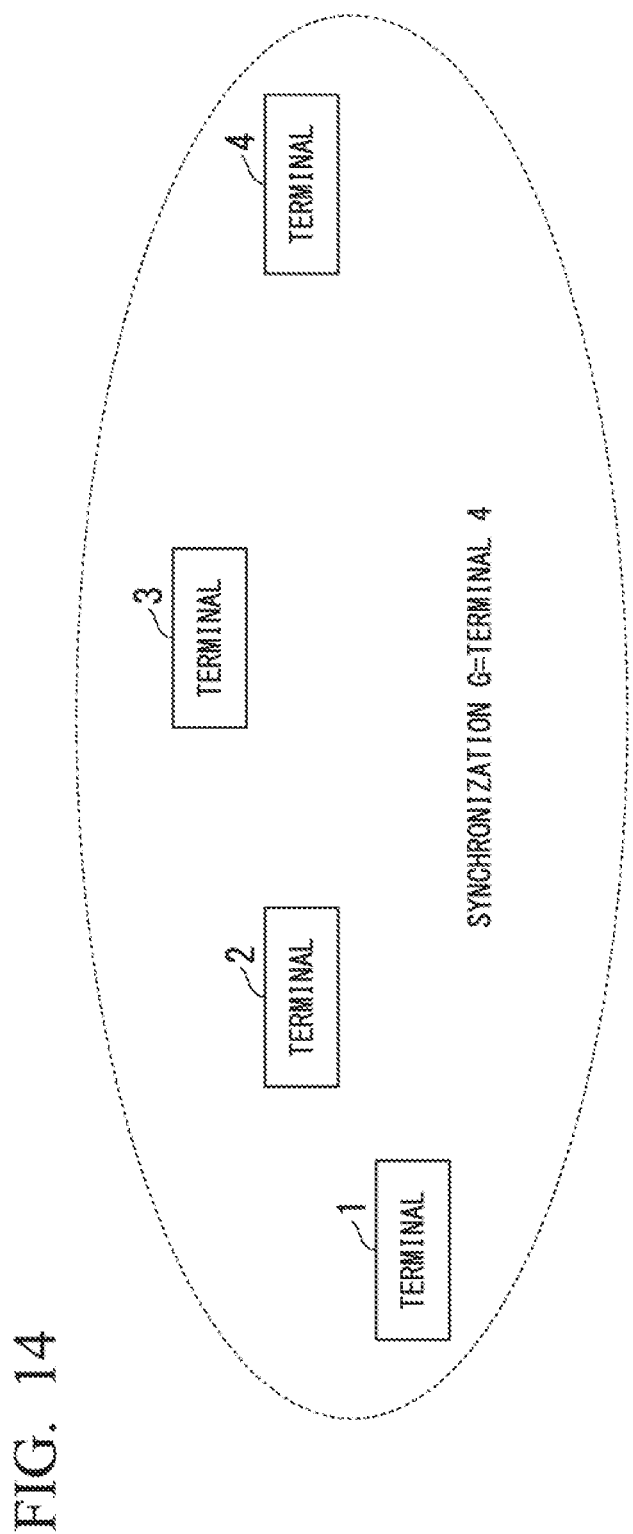
FIG. 14 is a diagram showing the system according to the first embodiment of the present invention.

By referring to FIGS. 14 and 17 to 19, an example in which a plurality of wireless communication terminals share information will be described. As shown in FIG. 14, the terminals 1, 2, 3, and 4 are synchronized. An operation at timings later than a timing in FIG. 14 will be described. The synchronization group of each terminal is the MAC address of the terminal 4.

FIG. 17 shows a channel table of respective terminals. In FIG. 17, a synchronization group (synchronization G) and a global sequence number (SeqNo) that each terminal stores as synchronization information are included within the channel table. Moreover, the channel table includes the global sequence numbers (SeqNo) included in the PAFs that each terminal has received from the other terminals. The synchronization groups of the terminals 1 to 4 are set to the MAC address of the terminal 4 and the terminals 1 to 4 are synchronized. The global sequence numbers of the respective terminals are the same.

The terminal 1 receives the PAF from the terminal 2. The channel table of the terminal 1 includes the global sequence number of the terminal 2. The terminal 2 receives the PAF from the terminals 1 and 3. The channel table of the terminal 2 includes the global sequence numbers of the terminals 1 and 3. The terminal 3 receives the PAF from the terminals 2 and 4. The channel table of the terminal 3 includes the global sequence numbers of the terminals 2 and 4. The terminal 4 receives the PAF from the terminal 3. The channel table of the terminal 4 includes the global sequence number of the terminal 3.

Figure 18:
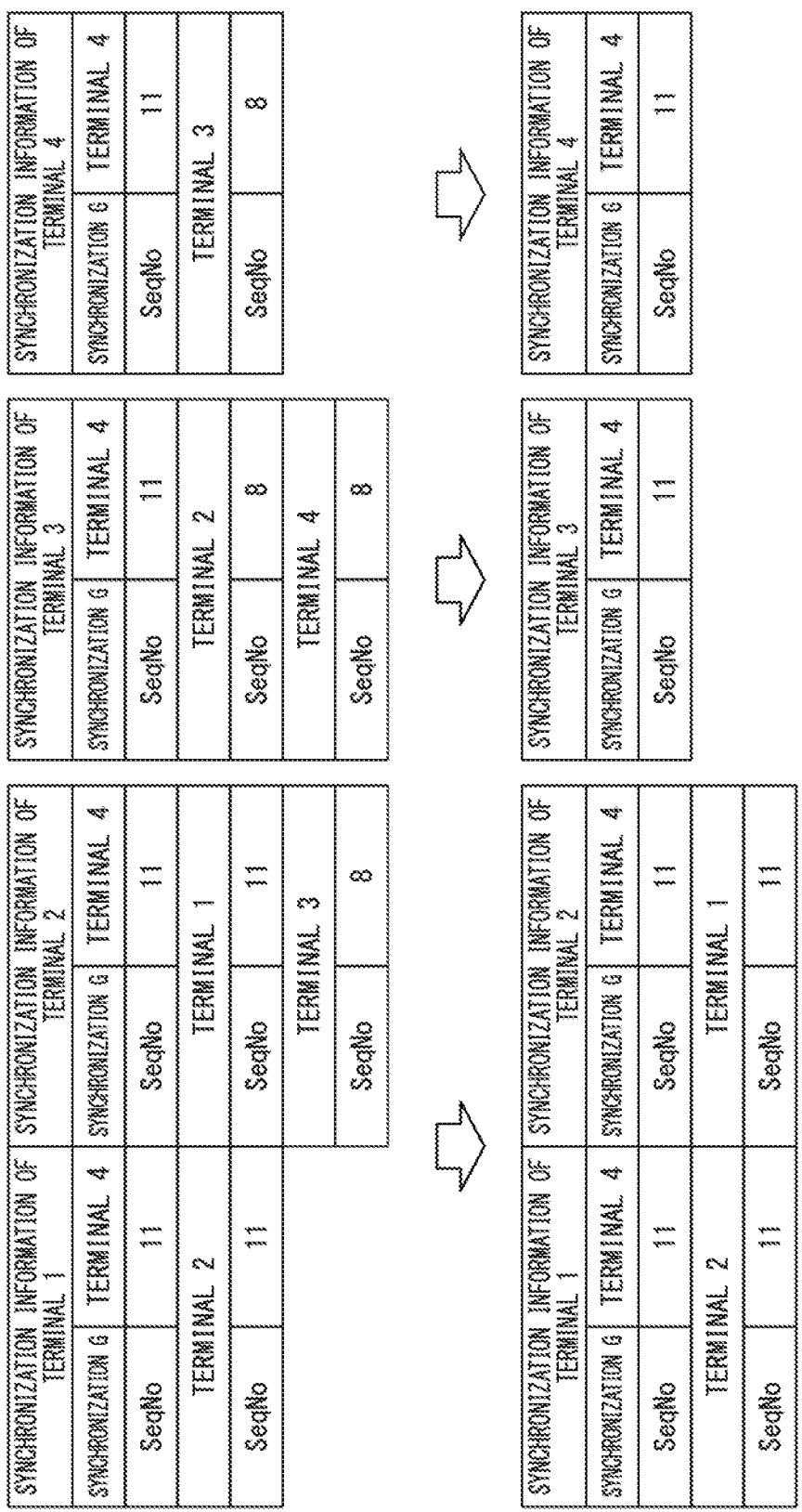
FIG. 18 is a diagram showing a channel table according to the second modification of the first embodiment of the present invention.

When the terminal 3 has moved outside a range where the terminal 3 can communicate with the terminals 2 and 4, the terminals 2 and 4 cannot receive the PAF from the terminal 3. Due to this, the global sequence number of the terminal 3 is not updated in the channel tables of the terminals 2 and 4. When a state in which the terminals 2 and 4 cannot communicate with the terminal 3 has continued for a period corresponding to three sequences, a difference between the global sequence number of the terminal 2 and the global sequence number of the terminal 3 in the channel table of the terminal 2 is 3. Similarly, a difference between the global sequence number of the terminal 4 and the global sequence number of the terminal 3 in the channel table of the terminal 4 is 3. Due to this, as shown in FIG. 18, the terminals 2 and 4 delete the global sequence number of the terminal 3.

Similarly, the terminal 3 cannot receive the PAF from the terminals 2 and 4. Due to this, the global sequence numbers of the terminals 2 and 4 are not updated in the channel table of the terminal 3. When a state in which the terminal 3 cannot communicate with the terminals 2 and 4 has continued for a period corresponding to three sequences, a difference between the global sequence number of the terminal 3 and the global sequence numbers of the terminals 2 and 4 in the channel table of the terminal 3 is 3. Due to this, as shown in FIG. 18, the terminal 3 deletes the global sequence numbers of the terminals 2 and 4.

Figure 19:
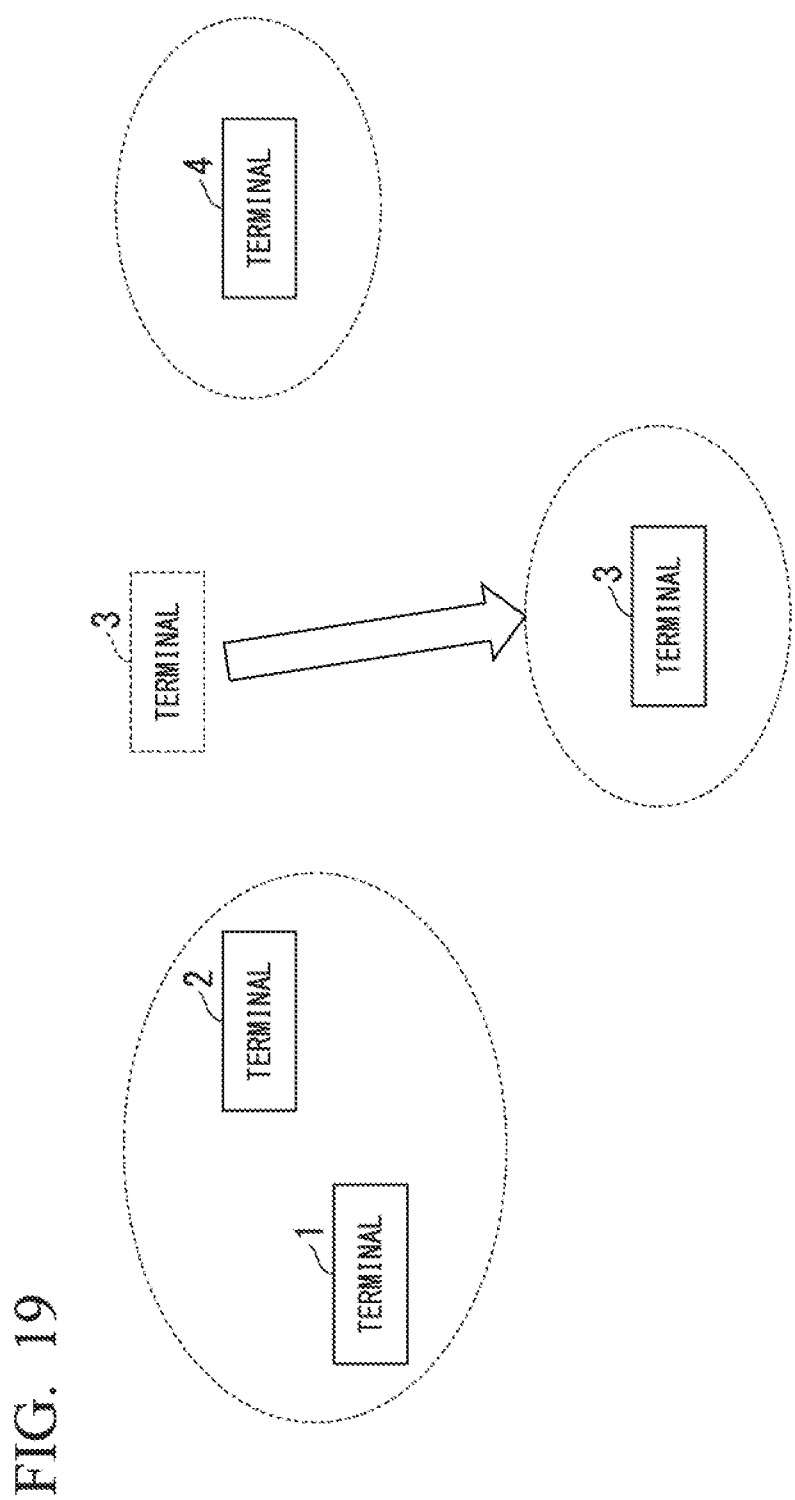
FIG. 19 is a diagram showing a system according to the second modification of the first embodiment of the present invention.

As a result, as shown in FIG. 19, the terminals 1 and 2 are synchronized with each other. The terminals 3 and 4 operate independently in terms of synchronization.

When a state in which it is not possible to receive the second communication channel information from the second wireless communication terminal has continued, the controller 103 may delete the second communication channel information from the storage medium 102. When a state in which it is not possible to receive the third communication channel information from the third wireless communication terminal has continued, the controller 103 may delete the third communication channel information from the storage medium 102. That is, when the wireless communication terminal 100 cannot receive the PAF from the second wireless communication terminal or the third wireless communication terminal for a predetermined period, the controller 103 may delete the second communication channel information or the third communication channel information.

By checking the global sequence number of the PAF, each wireless communication terminal can understand that the other wireless communication terminal synchronized with the own terminal has been desynchronized. When the information on the desynchronized wireless communication terminal is deleted, each wireless communication terminal can understand the latest wireless environment around the own terminal. Due to this, the wireless communication terminal can set an appropriate communication channel.

Second Embodiment

Figure 20:
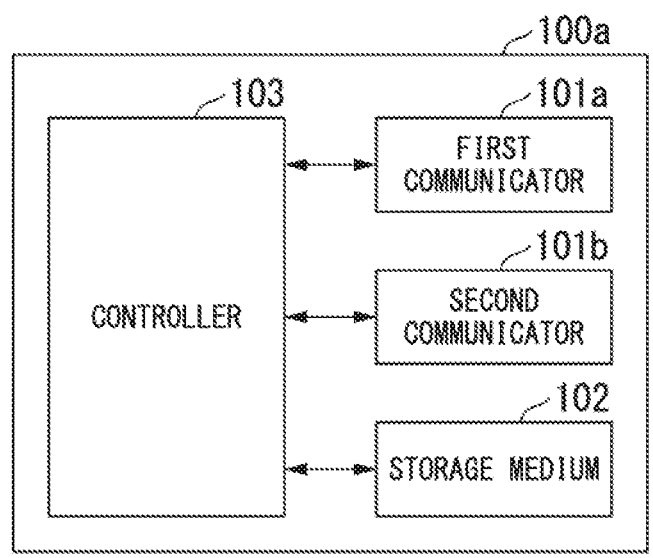
FIG. 20 is a block diagram showing a configuration of a wireless communication terminal according to a second embodiment of the present invention.

In a second embodiment of the present invention, the wireless communication terminal 100 is changed to a wireless communication terminal 100*a* shown in FIG. 20. FIG. 20 shows a configuration of the wireless communication terminal 100*a*. A difference between the configuration shown in FIG. 20 and the configuration shown in FIG. 1 will be described.

The wireless communication terminal 100*a* includes a first communicator 101*a* and a second communicator 101*b* different from the first communicator 101*a* as communicators. The controller 103 sets the first communication channel in the first communicator 101*a*. The controller 103 sets the fourth communication channel in the second communicator 101*b*. The controller 103 wirelessly receives a plurality of frames of images successively from terminals within a first wireless LAN using the first communicator 101*a*. In a third period, the controller 103 inhibits wireless transmission of the first communication channel information, the second communication channel information, and the third communication channel information using the second communicator 101*b*. The third period is a period from the start to the completion of wireless reception of one frame of images. In a fourth period, the controller 103 wirelessly transmits the second communication channel information, the third communication channel information, and the first communication channel information using the second communicator 101*b*. In the fourth period, the controller 103 cancels inhibition of wireless transmission of these pieces of communication channel information. The fourth period is a period from the completion of wireless reception of one frame of images to the start of wireless reception of the next one frame of images.

In the fourth period, the controller 103 wirelessly receives the second communication channel information from the second wireless communication terminal through the fourth communication channel using the second communicator 101b. In the fourth period, the controller 103 wirelessly transmits the first communication channel information stored in the storage medium 102 and the received second communication channel information to the third wireless communication terminal through the fourth communication channel using the second communicator 101b.

In the fourth period, the controller 103 wirelessly receives the third communication channel information from the third wireless communication terminal through the fourth communication channel using the second communicator 101b. In the fourth period, the controller 103 wirelessly transmits the first communication channel information stored in the storage medium 102 and the received third communication channel information to the second wireless communication terminal through the fourth communication channel using the second communicator 101b.

The first communicator 101a and the second communicator 101b are wireless modules that operate according to a 5-GHz-band wireless LAN standard of IEEE 802.11. The first and second communicators 101a and 101b include an antenna. Alternatively, the first communicator 101a and the antenna are constituted separately and the first communicator 101a is connected to the antenna. The second communicator 101b and the antenna are constituted separately and the second communicator 101b is connected to the antenna. The first communicator 101a receives images from an image transmission terminal (not shown) on a real-time basis. The wireless communication terminal 100a and the image transmission terminal belong to the same wireless LAN. The second communicator 101b receives the communication channel information from the other wireless communication terminal and transmits the communication channel information to the other wireless communication terminal. Different communication channels are set in the first communicator 101a and the second communicator 101b. That is, the first communication channel and the fourth communication channel are different from each other.

The quality of a communication channel used by the first communicator 101a that receives images may deteriorate. For example, pulses of a weather radar may be detected by the DFS function. In this case, the controller 103 switches a communicator that receives images from the first communicator 101a to the second communicator 101b so that image reception is inherited to another communication channel. In this way, it is possible to decrease the possibility that interruption of real-time image reception occurs.

Image reception may be performed by either one of the first communicator 101a or the second communicator 101b. In the following example, an example in which the first communicator 101a receives images and the second communicator 101b transmits and receives the PAF will be described.

The controller 103 detects a reception state of images. For example, the controller 103 detects the start of reception of one frame of images and the completion of reception. Information such as a data size of one frame and a frame sequence number is stored in data packets that form one frame of images. Due to this, the controller 103 can detect a reception state of one frame of images.

The configuration shown in FIG. 20 other than the above-described features is the same as the configuration shown in FIG. 1.

Figure 21:
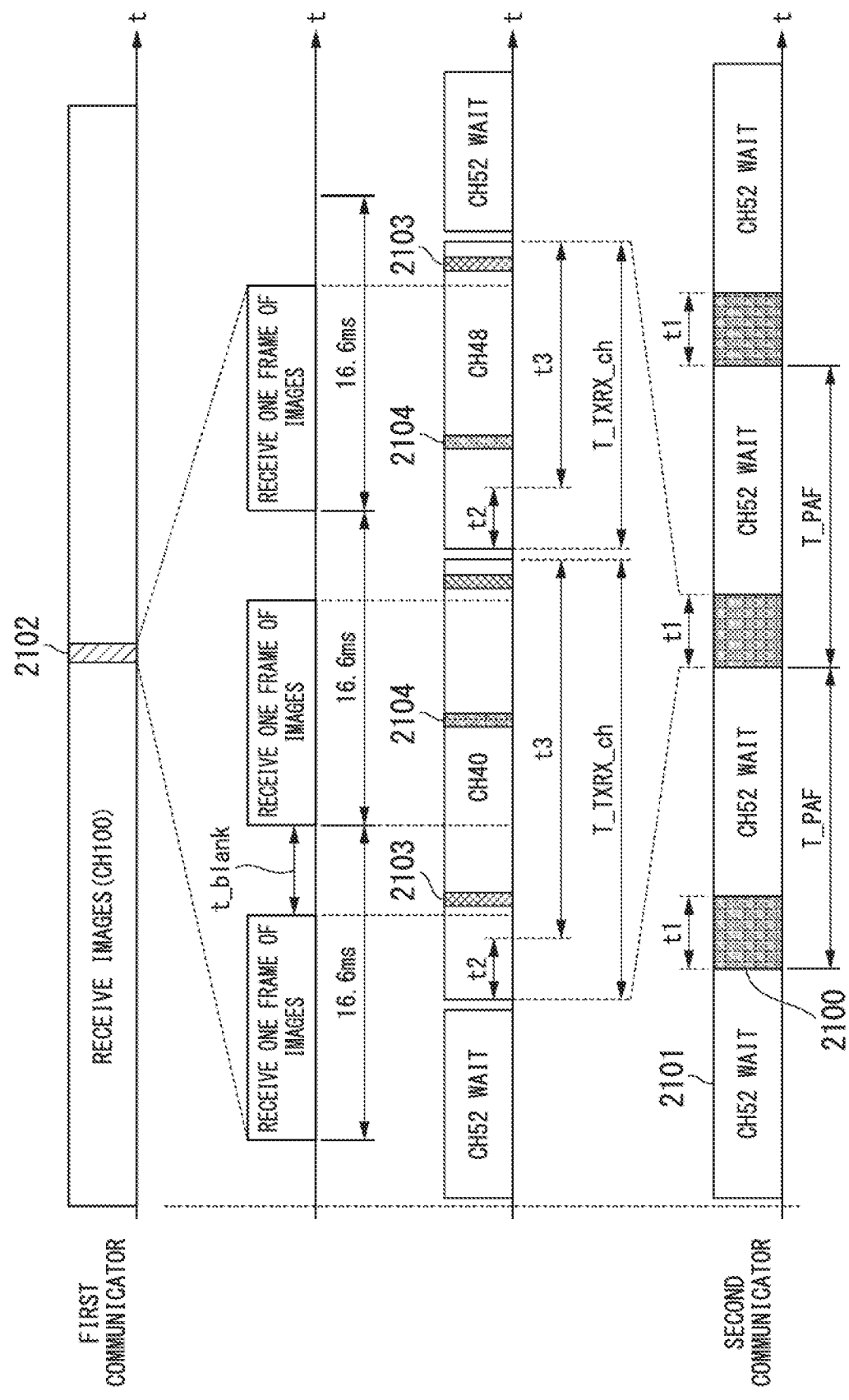
FIG. 21 is a timing chart showing an operation of the wireless communication terminal according to the second embodiment of the present invention.

FIG. 21 shows an example of an operation of the wireless communication terminal 100a. The rightward direction in FIG. 21 indicates a direction in which time passes. By referring to FIG. 21, the operation of the wireless communication terminal 100a will be described. The operation of the wireless communication terminal 100a until PAF search is performed after the wireless communication terminal 100a is activated is the same as the operation of the wireless communication terminal 100 of the first embodiment. Due to this, the description of the operation will be omitted. FIG. 21 shows an operation of the wireless communication terminal 100a after the wireless communication terminal 100a performs PAF search.

In FIG. 21, the states of the first communicator 101a and the second communicator 101b are shown. The first communicator 101a receives images through a communication channel CH100. The second communicator 101b transmits and receives the PAF through communication channels CH40 and CH48. In the example shown in FIG. 21, the operation in the PAF communication period after the second communicator 101b receives the PAF through the communication channels CH40 and CH48 in the PAF search period is shown.

A period t1 is allocated to a PAF communication period 2100. For example, the period t1 is several seconds. For example, the cycle T_PAF in which the PAF communication period 2100 starts is several tens of seconds to several hundreds of seconds. In a period 2101 outside the PAF communication period 2100, the communication channel CH52 is set in the second communicator 101b, and the second communicator 101b stands by. The communication channel CH52 set in the second communicator 101b functions as a backup channel for image communication. It is assumed that channel availability check (CAC) requested by DFS is completed before the communication channel is switched to the communication channel CH52.

The communication channel set in the second communicator 101b is not limited to the communication channel CH52. A communication channel which does not require DFS may be set in the second communicator 101b.

A detailed state in the PAF communication period 2100 is shown on the upper side of the PAF communication period 2100. The communication channel set in the second communicator 101b is switched from the communication channel CH52 to a communication channel for PAF communication. Immediately after the switching, transmission of the PAF using the second communicator 101b is inhibited for a period t2. The second communicator 101b can only receive the PAF until the period t2 elapses from the switching of the communication channel. For example, the period t2 is from several tens of ins to approximately 100 ms. A PAF transmission possible period in which PAF can be transmitted starts from a timing at which the period t2 has elapsed. A period t3 is allocated to the PAF transmission possible period. The sum of the periods t2 and t3 is the period T_TXRX_ch. A PAF reception possible period in which the PAF can be received is the PAF communication period 2100.

A state in a period 2102 within a period in which the first communicator 101a receives images is shown on the lower side of the period 2102. When the frame rate of the image is 60 fps, reception of one frame of images is completed within 16.6 ms. This period of 16.6 ms is the third period. A period in which images are not received is present from completion of reception of one frame of images until start of reception of the next one frame of images. The length t_blank of this period is from several ms to approximately 10 ms, for example. In a period in which images are not received, if the period t2 has not elapsed after the communication channel of the second communicator 101b is switched, transmission of the PAF using the second communicator 101b is inhibited.

The controller 103 detects the start and the completion of reception of one frame of images. The controller 103 calculates a timing at which 16.6 ms has elapsed from the start of reception of one frame of images. At this timing, reception of the next one frame of images starts. The controller 103 determines that images are not received from the completion of reception of one frame of images until the start of reception of the next one frame of images.

The controller 103 may set a reception completion flag to 1 when reception of one frame of images is completed. When a period remaining until the start of reception of the next one frame of images reaches a predetermined period, the controller 103 may set a reception completion flag to 0. For example, the predetermined period is 1 ms. The controller 103 may detect an image reception state on the basis of change in the reception completion flag. The reception completion flag is stored in the storage medium 102.

The controller 103 determines whether or not the present time point is a time point within the PAF communication period 2100. The controller 103 determines whether or not the present time point belongs to a period (t_blank) in which images are not received. The controller 103 determines whether or not the present time point is a time point within a period t3 in FIG. 21. When the present time point is a time point within the PAF communication period 2100, belongs to a period in which images are not received, and is a time point within the period t3, the controller 103 determines that it is possible to transmit the PAF. When the present time point is a time point within the PAF communication period 2100 and the first communicator 101a is receiving one frame of images, the controller 103 inhibits transmission of the PAF. When the present time point is a time point within the PAF communication period 2100 and is not a time point within the period t3, the controller 103 inhibits transmission of the PAF. While transmission of the PAF is being inhibited in the PAF communication period 2100, the second communicator 101b stands by for receiving the PAF.

One PAF communication period (t1) includes a plurality of transmission possible periods (t3) for performing PAF transmission and a plurality of reception possible periods (t2 and t3) for performing PAF reception. In the example shown in FIG. 21, one PAF communication period 402 includes two transmission possible periods and two reception possible periods. In the example shown in FIG. 21, one reception possible period includes one transmission possible period. In one transmission possible period and one reception possible period, the controller 103 sets a predetermined communication channel in the second communicator 101b and performs transmission 2103 and reception 2104 of the PAF using the second communicator 101b.

The communication channel set in the second communicator 101b in one transmission possible period and one reception possible period is the fourth communication channel. The communication channel set in the second communicator 101b in one transmission possible period and one reception possible period and the communication channel set in the second communicator 101b in another transmission possible period and another reception possible period may be the same or different. In the example shown in FIG. 21, after one transmission possible period and one reception possible period end, the controller 103 switches the communication channel set in the second communicator 101b to another communication channel. While one transmission possible period and one reception possible period continue, the communication channel set in the second communicator 101b is maintained. One or more times of transmission 2103 are performed in each transmission possible period. One or more times of receptions 2104 are performed in each reception possible period.

As described above, in a period from the start to the completion of wireless reception of one frame of images, the controller 103 inhibits wireless transmission of the PAF using the second communicator 101b. The PAF includes communication channel information. In a period (t_blank) from the completion of wireless reception of one frame of images to the start of wireless reception of the next one frame of images, the controller 103 performs wireless transmission of the PAF using the second communicator 101b. The image may be compressed or need not be compressed.

The first and second communicators 101a and 101b are direct-switching-type wireless devices. In order to avoid interference such as second order intermodulation distortion, transmission of information using the second communicator 101b is inhibited during reception of images in the first communicator 101a.

The procedure of a process executed by the wireless communication terminal 100a is similar to that of the process shown in FIG. 5 except for the following features. In the PAF search (step S101), the first communicator 101a is used instead of the communicator 101. The PAF communication (step S103) will be described later. In step S104, the controller 103 determines a communication channel and sets the determined communication channel in the first communicator 101a. In step S104, the controller 103 wirelessly receives one frame of images from an image transmission terminal using the first communicator 101a. When the process of step S104 is repeated, the controller 103 wirelessly receives a plurality of frames of images continuously from the image transmission terminal using the first communicator 101a.

Figure 22:
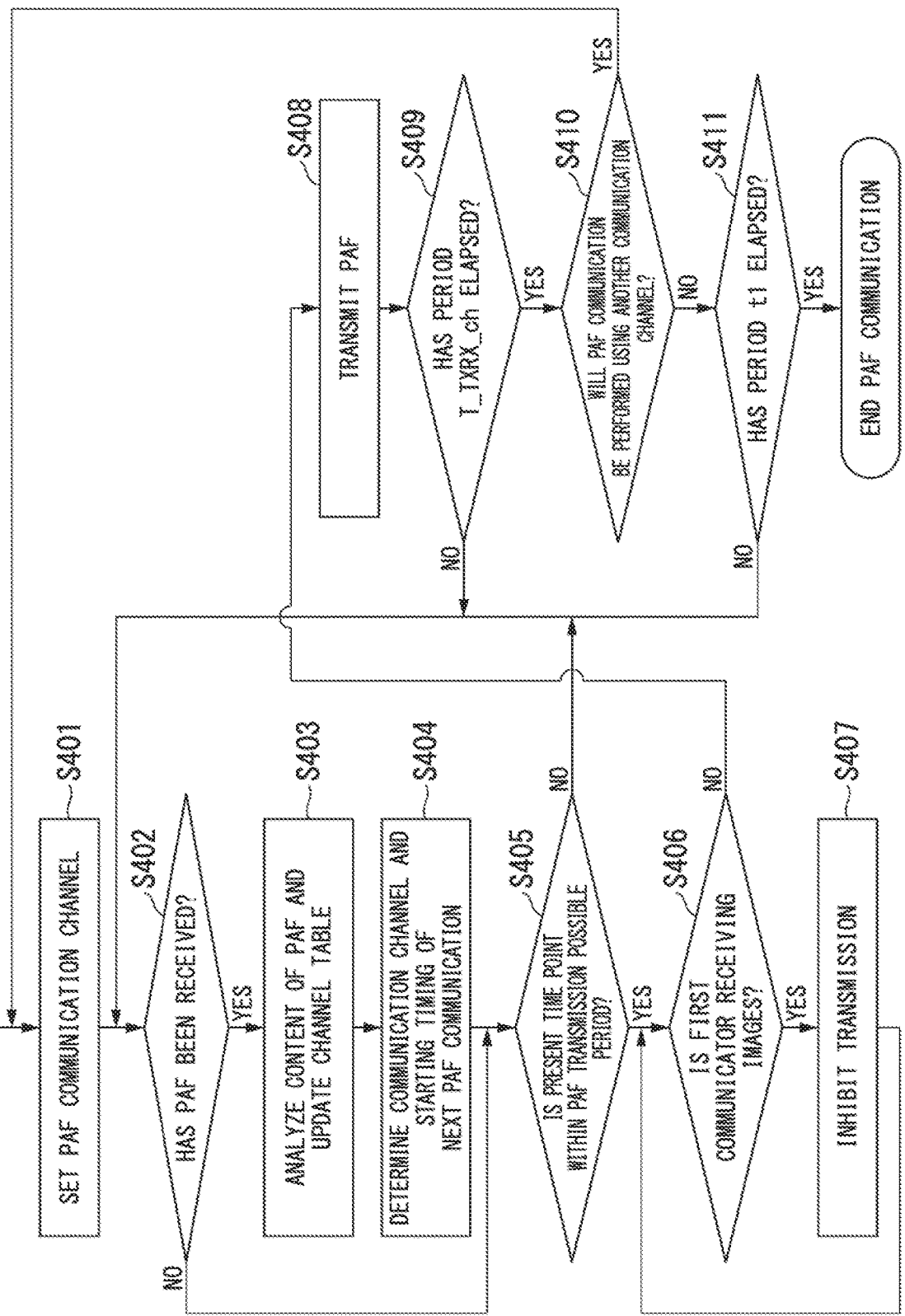
FIG. 22 is a flowchart showing the procedure of a process executed by the wireless communication terminal according to the second embodiment of the present invention.

FIG. 22 shows the procedure of a process of PAF communication (step S103). By referring to FIG. 22, the operation of the wireless communication terminal 100a in PAF communication will be described.

The processes of steps S401 to S404 are similar to the processes of steps S301 to S304 shown in FIG. 7 except that the second communicator 101b is used instead of the communicator 101. Therefore, the description of the processes of steps S401 to S404 will be omitted.

After step S404, the controller 103 determines whether or not the present time point is within a PAF transmission possible period (step S405). The PAF transmission possible period is a period at which the period t2 has elapsed from the switching of the communication channel of the second communicator 101b in the PAF communication period 2100 in FIG. 21.

When the controller 103 determines in step S405 that the present time point is not within the PAF transmission possible period, the process of step S402 is executed. When the controller 103 determines in step S405 that the present time point is within the PAF transmission possible period, the controller 103 determines whether or not the first communicator 101a is receiving images (step S406).

When the controller 103 determines in step S406 that the first communicator 101a is receiving images, the controller 103 inhibits transmission of the PAF and other information using the second communicator 101b (step S407). In this way, wireless transmission of communication channel information is inhibited in the third period from the start to the completion of wireless reception of one frame of images. After step S407, the process of step S406 is executed.

When the controller 103 determines in step S406 that the first communicator 101a is not receiving images, the controller 103 cancels inhibition of transmission using the second communicator 101b and transmits the PAF to the other wireless communication terminal using the second communicator 101b (step S408). In this way, wireless transmission of communication channel information is performed in the fourth period from the completion of wireless reception of one frame of images to the start of wireless reception of the next one frame of images.

After step S408, the controller 103 determines whether or not the period T_TXRX_ch has elapsed from the starting timing of the PAF reception possible period (step S409).

When the controller 103 determines in step S409 that the period T_TXRX_ch has not elapsed, the process of step S402 is executed. When the controller 103 determines in step S409 that the period T_TXRX_ch has elapsed, the controller 103 determines whether or not PAF communication is to be performed through another communication channel (step S410).

When the controller 103 determines in step S410 that PAF communication is to be performed through another communication channel, the process of step S401 is executed. In step S401, the controller 103 changes the communication channel set in the second communicator 101b. When the controller 103 determines in step S410 that PAF communication is not to be performed through another communication channel, the controller 103 determines whether or not the period t1 has elapsed from the starting timing of the PAF communication period 2100. That is, the controller 103 determines whether or not the PAF communication period 2100 has ended (step S411).

When the controller 103 determines in step S411 that the period t1 has not elapsed (that is, the PAF communication period 2100 has not ended), the process of step S402 is executed. When the controller 103 determines in step S411 that the period t2 has elapsed (that is, the PAF communication period 2100 has ended), PAF communication ends.

The order of the processes shown in FIG. 22 may be changed. For example, the processes of steps S405 to S408 may be executed after the process of step S401 is executed. The processes of steps S402 to S404 may be executed after the process of step S408 is executed. That is, the processes of steps S405 to S408 may be executed before the processes of steps S402 to S404 are executed.

Although the determination in step S409 is performed on the basis of the period T_TXRX_ch, the determination in step S409 may be performed on the basis of the number of times the PAF was transmitted in step S408. A determination method is similar to the method of determination in step S311 shown in FIG. 16.

In the PAF communication period 2100, when the quality of a communication channel used by the first communicator 101a is deteriorated, the controller 103 immediately changes the communicator for receiving images from the first communicator 101a to the second communicator 101b. After that, the controller 103 performs PAF communication using the first communicator 101a. The content of the channel table is maintained even when the communicator that performs PAF communication is switched. Therefore, the synchronization between the wireless communication terminal 100 and the other wireless communication terminals is maintained.

In the second embodiment, information on communication channels used by a first terminal and a second terminal which belong to different wireless LANs and cannot communicate directly with each other can be shared between the first and second terminals.

As described above, transmission of the PAF using the second communicator 101b is inhibited during reception of images using the first communicator 101a. Therefore, the influence on the first communicator 101a caused by interference such as second order intermodulation distortion and deterioration of image reception quality is suppressed.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal comprising a communicator, a storage medium, and a controller, wherein
the wireless communication terminal belongs to a first wireless LAN (local area network),
a first communication channel is used when communication is performed in the first wireless LAN,
a second communication channel is used when communication is performed in a second wireless LAN different from the first wireless LAN,
a third communication channel is used when communication is performed in a third wireless LAN different from the first wireless LAN and different from the second wireless LAN,
a fourth communication channel is used when communication is performed between the first wireless LAN, the second wireless LAN, and the third wireless LAN,
the storage medium is configured to store first communication channel information indicating the first communication channel,
the controller is configured to wirelessly receive second communication channel information from a second wireless communication terminal through the fourth communication channel using the communicator,
the second communication channel information indicates the second communication channel,
the second wireless communication terminal belongs to the second wireless LAN,
the storage medium is configured to store the received second communication channel information,
the controller is configured to wirelessly transmit the first communication channel information stored in the storage medium and the received second communication channel information to a third wireless communication terminal through the fourth communication channel using the communicator,
the third wireless communication terminal belongs to the third wireless LAN,
the controller is configured to wirelessly receive third communication channel information from the third wireless communication terminal through the fourth communication channel using the communicator,
the third communication channel information indicates the third communication channel,
the storage medium is configured to store the received third communication channel information, and the controller is configured to wirelessly transmit the first communication channel information stored in the storage medium and the received third communication channel information to the second wireless communication terminal through the fourth communication channel using the communicator.

2. The wireless communication terminal according to claim 1, wherein
the controller is configured to wirelessly receive the second communication channel information from the second wireless communication terminal by means of a public action frame defined by IEEE 802.11 using the communicator,
the controller is configured to wirelessly transmit the first communication channel information and the second communication channel information to the third wireless communication terminal by means of the public action frame using the communicator,
the controller is configured to wirelessly receive the third communication channel information from the third wireless communication terminal by means of the public action frame using the communicator, and
the controller is configured to wirelessly transmit the first communication channel information and the third communication channel information to the second wireless communication terminal by means of the public action frame using the communicator.

3. The wireless communication terminal according to claim 1, wherein
in a predetermined first period, the controller is configured to set a plurality of predetermined communication channels in the communicator sequentially as the fourth communication channel,
in the first period, the controller is configured to wirelessly receive second timing information from the second wireless communication terminal using the communicator and wirelessly receive third timing information from the third wireless communication terminal using the communicator,
the second timing information indicates a timing at which the second wireless communication terminal wirelessly transmits the second communication channel information,
the third timing information indicates a timing at which the third wireless communication terminal wirelessly transmits the third communication channel information,
the storage medium is configured to store the received second timing information and the received third timing information,
the controller is configured to determine a starting timing of a second period later than the first period on the basis of at least one of the received second timing information and the received third timing information,
the controller is configured to maintain the fourth communication channel set in the communicator in the second period, after the controller sets the fourth communication channel in the communicator,
in the second period, the controller is configured to wirelessly receive the second communication channel information from the second wireless communication terminal using the communicator and wirelessly receive the third communication channel information from the third wireless communication terminal using the communicator, and
in the second period, the controller is configured to wirelessly transmit the first communication channel information and the second communication channel information to the third wireless communication terminal using the communicator and wirelessly transmit the first communication channel information and the third communication channel information to the second wireless communication terminal using the communicator.

4. The wireless communication terminal according to claim 3, wherein
the fourth communication channel includes a fifth communication channel and a sixth communication channel different from the fifth communication channel, and
in the second period, the controller is configured to perform wireless transmission of the first communication channel information, the second communication channel information, and the third communication channel information through the fifth communication channel and the sixth communication channel.

5. The wireless communication terminal according to claim 3, wherein
in the second period, the controller is configured to wirelessly receive the second communication channel information a plurality of times from the second wireless communication terminal using the communicator and wirelessly receive the third communication channel information a plurality of times from the third wireless communication terminal using the communicator, and
in the second period, the controller is configured to wirelessly transmit the first communication channel information and the second communication channel information a plurality of times to the third wireless communication terminal using the communicator and wirelessly transmit the first communication channel information and the third communication channel information a plurality of times to the second wireless communication terminal using the communicator.

6. The wireless communication terminal according to claim 1, wherein
the communicator includes a first communicator and a second communicator different from the first communicator,
the controller is configured to set the first communication channel in the first communicator,
the controller is configured to set the fourth communication channel in the second communicator,
the controller is configured to wirelessly receive a plurality of frames of images continuously from a terminal in the first wireless LAN using the first communicator,
in a third period, the controller is configured to inhibit wireless transmission of the first communication channel information, the second communication channel information, and the third communication channel information using the second communicator,
the third period is a period from the start to the completion of the wireless reception of one frame of images,
in a fourth period, the controller is configured to perform wireless transmission of the second communication channel information, the third communication channel information, and the first communication channel information using the second communicator, and
the fourth period is a period from the completion of the wireless reception of one frame of images to the start of the wireless reception of the next one frame of images.

7. The wireless communication terminal according to claim 1, wherein the fourth communication channels used for wireless communication of the first communication channel information, the fourth communication channels used for wireless communication of the second communication channel information, and the fourth communication channels used for wireless communication of the third communication channel information are the same.

8. A wireless communication method comprising a first step, a second step, a third step, and a fourth step executed by a wireless communication terminal, wherein
the wireless communication terminal belongs to a first wireless LAN (local area network),
a first communication channel is used when communication is performed in the first wireless LAN,
a second communication channel is used when communication is performed in a second wireless LAN different from the first wireless LAN,
a third communication channel is used when communication is performed in a third wireless LAN different from the first wireless LAN and different from the second wireless LAN,
a fourth communication channel is used when communication is performed between the first wireless LAN, the second wireless LAN, and the third wireless LAN,
in the first step, second communication channel information is wirelessly received from a second wireless communication terminal through the fourth communication channel, and the received second communication channel information is stored in a storage medium,
the second communication channel information indicates the second communication channel,
the second wireless communication terminal belongs to the second wireless LAN,
in the second step, first communication channel information stored in advance in the storage medium and the received second communication channel information are wirelessly transmitted to a third wireless communication terminal through the fourth communication channel,
the third wireless communication terminal belongs to the third wireless LAN,
in the third step, third communication channel information is wirelessly received from the third wireless communication terminal through the fourth communication channel, and the received third communication channel information is stored in the storage medium,
the third communication channel information indicates the third communication channel, and
in the fourth step, the first communication channel information stored in the storage medium and the received third communication channel information are wirelessly transmitted to the second wireless communication terminal through the fourth communication channel.

9. A non-transitory computer-readable recording medium saving a program for causing a computer of a wireless communication terminal to execute a first step, a second step, a third step, and a fourth step, wherein
the wireless communication terminal belongs to a first wireless LAN (local area network),
a first communication channel is used when communication is performed in the first wireless LAN,
a second communication channel is used when communication is performed in a second wireless LAN different from the first wireless LAN,
a third communication channel is used when communication is performed in a third wireless LAN different from the first wireless LAN and different from the second wireless LAN,
a fourth communication channel is used when communication is performed between the first wireless LAN, the second wireless LAN, and the third wireless LAN,
in the first step, second communication channel information is wirelessly received from a second wireless communication terminal through the fourth communication channel, and the received second communication channel information is stored in a storage medium,
the second communication channel information indicates the second communication channel,
the second wireless communication terminal belongs to the second wireless LAN,
in the second step, first communication channel information stored in advance in the storage medium and the received second communication channel information are wirelessly transmitted to a third wireless communication terminal through the fourth communication channel,
the third wireless communication terminal belongs to the third wireless LAN,
in the third step, third communication channel information is wirelessly received from the third wireless communication terminal through the fourth communication channel, and the received third communication channel information is stored in the storage medium,
the third communication channel information indicates the third communication channel, and
in the fourth step, the first communication channel information stored in the storage medium and the received third communication channel information are wirelessly transmitted to the second wireless communication terminal through the fourth communication channel.

* * * * *